US010324531B2

(12) United States Patent
Grant et al.

(10) Patent No.: US 10,324,531 B2
(45) Date of Patent: Jun. 18, 2019

(54) HAPTIC FEEDBACK USING A FIELD OF VIEW

(71) Applicant: Immersion Corporation, San Jose, CA (US)

(72) Inventors: Danny A. Grant, Montreal (CA); William S. Rihn, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 15/390,868

(22) Filed: Dec. 27, 2016

(65) Prior Publication Data

US 2018/0181201 A1   Jun. 28, 2018

(51) Int. Cl.
*G06F 3/01* (2006.01)

(52) U.S. Cl.
CPC .............. *G06F 3/016* (2013.01); *G06F 3/012* (2013.01); *G06F 3/013* (2013.01)

(58) Field of Classification Search
CPC .................................. G06F 3/016; G06F 3/013
See application file for complete search history.

(56) References Cited

U.S. PATENT DOCUMENTS

| | | |
|---|---|---|
| 9,466,187 B2 | 10/2016 | Grant et al. |
| 9,588,586 B2 | 3/2017 | Rihn et al. |
| 9,711,015 B2 | 7/2017 | Saboune et al. |
| 2010/0034404 A1* | 2/2010 | Dent ............... H04R 5/02 381/310 |
| 2014/0218184 A1 | 8/2014 | Grant et al. |
| 2014/0256438 A1* | 9/2014 | Grant ............. A63F 13/10 463/36 |

(Continued)

FOREIGN PATENT DOCUMENTS

| | | |
|---|---|---|
| EP | 3040812 | 7/2016 |
| WO | 2006100645 | 9/2006 |

(Continued)

OTHER PUBLICATIONS

EP17210089.3, "Extended European Search Report", dated Oct. 24, 2018, 19 pages.

(Continued)

*Primary Examiner* — Ariel A Balaoing
(74) *Attorney, Agent, or Firm* — Kilpatrick Townsend and Stockton LLP

(57) ABSTRACT

One illustrative system disclosed herein includes a computing device in communication with a display device and a sensor. The display device is configured to display a plurality of content and the sensor is configured to detect a field of view of a user of the computing device relative to the display device. The sensor can transmit a signal associated with the field of view to a processor in communication with the sensor. The processor is configured to determine a direction of the field of view of the user based on the signal. The processor is also configured to determine that a content displayed by the display device and associated with a haptic effect is within the field of view of the user. The processor is also configured to determine a haptic effect associated with the content and transmit a haptic signal associated with the haptic effect. The illustrative system also includes a haptic output device configured to receive the haptic signal and output the haptic effect.

24 Claims, 7 Drawing Sheets

(56) References Cited

U.S. PATENT DOCUMENTS

| | | | |
|---|---|---|---|
| 2015/0268723 A1* | 9/2015 | Saboune | G06F 3/016 345/156 |
| 2015/0316985 A1* | 11/2015 | Levesque | G06T 19/006 345/156 |
| 2015/0323993 A1 | 11/2015 | Levesque et al. | |
| 2015/0355711 A1* | 12/2015 | Rihn | G06F 3/011 340/407.2 |
| 2017/0076565 A1 | 3/2017 | Saboune et al. | |

FOREIGN PATENT DOCUMENTS

| | | |
|---|---|---|
| WO | 2014006799 | 1/2014 |
| WO | 2014095756 | 6/2014 |

OTHER PUBLICATIONS

EP17210089.3 , "Partial European Search Report", dated Apr. 24, 2018, 21 pages.

* cited by examiner

HAPTIC FEEDBACK USING A FIELD OF VIEW

FIELD OF INVENTION

The present disclosure relates generally to user interface devices. More specifically, but not by way of limitation, this disclosure relates to haptic feedback using a field of view.

BACKGROUND

Display devices can be used to provide various content (e.g., images, vides, etc.) to a user of a display device. The display device can also be used to create a virtual reality environment that can simulate the user's physical presence and environment and allow the user to interact with the virtual objects in the simulated environment. The user may look at or interact with content or virtual objects displayed via the display devices (e.g., by touching or looking in the direction of the content or the virtual objects). Some display devices, however, may lack haptic feedback capabilities. Moreover, some display devices and virtual reality devices may not provide haptic feedback relevant to the content or virtual objects displayed via the display devices or relevant to the user's interaction with the content or virtual objects.

SUMMARY

Various embodiments of the present disclosure provide systems and methods for haptic feedback using a field of view.

In one embodiment, a system of the present disclosure may comprise a computing device communicatively coupled to a display device. The display device can be configured to display a plurality of content. The system also comprises a sensor communicatively coupled to the computing device and configured to detect a field of view of a user of the computing device relative to the display device and transmit a signal associated with the field of view. The system also comprises a processor communicatively coupled to the sensor for receiving the signal. The processor can be configured to determine a direction of the field of view of the user based at least in part on the signal. The processor can also be configured to determine that a content displayed via the display device and within the direction of the field of view of the user is associated with a haptic effect. The processor can further be configured to determine the haptic effect associated with the content and transmit a haptic signal associated with the haptic effect associated with the content. The system may further comprise a haptic output device configured to receive the haptic signal and output the haptic effect.

In another embodiment, a method of the present disclosure may comprise: detecting, by a sensor, a field of view of a user of a computing device relative to a display device communicatively coupled to the computing device, the display device configured to display a plurality of content; transmitting, by the sensor, a sensor signal associated with the field of view to a processor; determining, by the processor, a direction of the field of view based at least in part on the sensor signal; determining, by the processor, that a content displayed via the display device is within the field of view of the user based on the direction of the field of view; determining, by the processor, a haptic effect associated with the content; transmitting, by the processor, a haptic signal associated with the haptic effect to a haptic output device; and outputting, by the haptic output device, the haptic effect.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
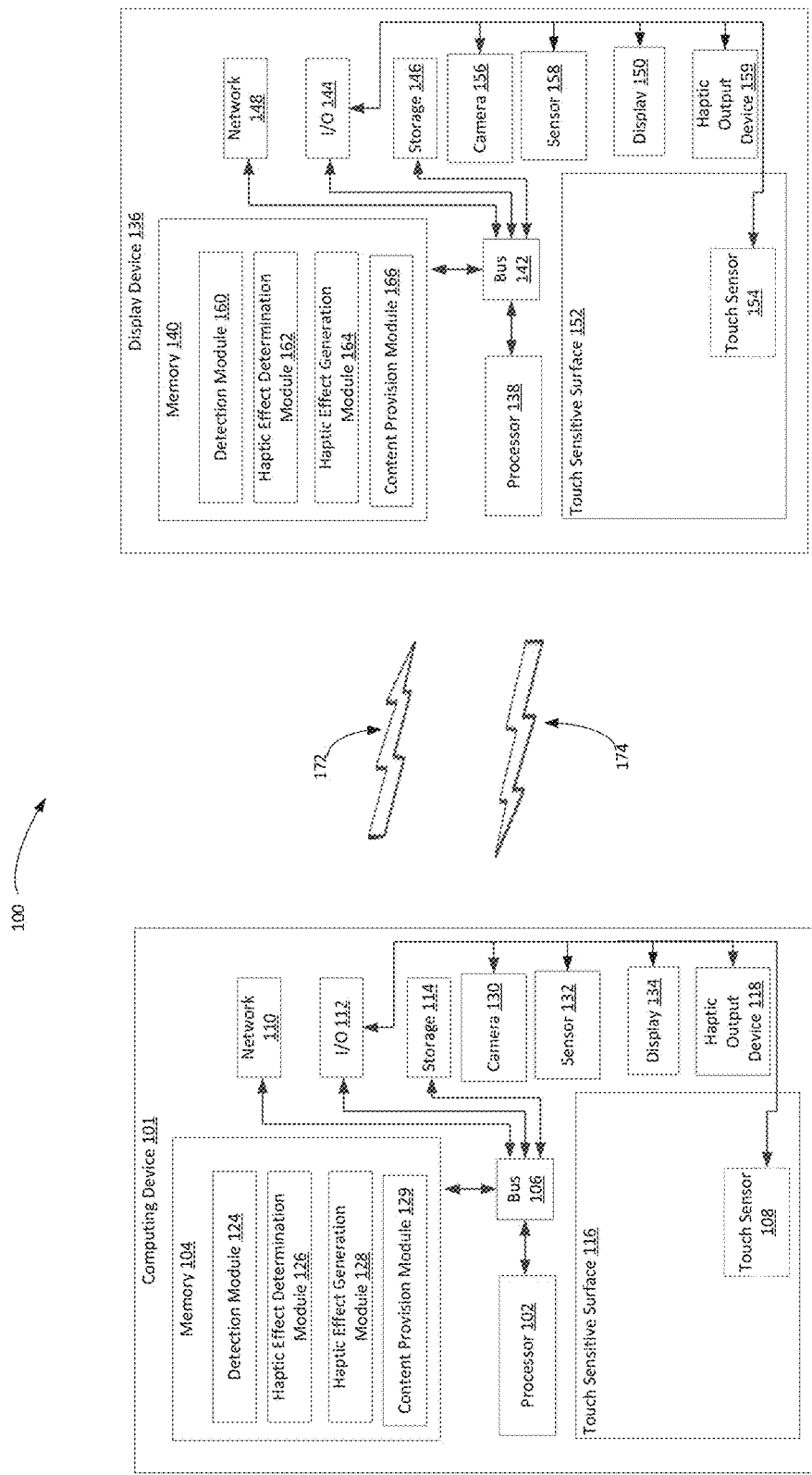
FIG. 1 is a block diagram showing a system for haptic feedback using a field of view of view according to one embodiment.

Reference now will be made in detail to various and alternative illustrative embodiments and to the accompanying drawings. Each example is provided by way of explanation and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations that come within the scope of the appended claims and their equivalents.

Illustrative Examples of Haptic Feedback Using a Field of View

One illustrative embodiment of the present disclosure comprises a display device, such as a video screen, a computer, or a virtual reality headset. The display device comprises a sensor, a memory, and a processor in communication with each of these elements.

In the illustrative embodiment, the sensor may detect a field of view or a direction of an eye gaze of a user of the display device (e.g., a user looking at or toward the display device). For example, the display device may comprise a video screen with an embedded or proximate sensor for detecting the user's field of view with respect to content (e.g., texts, images, sounds, videos, characters, virtual objects, virtual animations, etc.) on the video screen. The sensor can transmit a signal to the processor, which determines whether content displayed on the video screen and associated with a haptic effect is within the field of view of the user.

In the illustrative embodiment, the processor can transmit a haptic signal associated with the haptic effect to a haptic output device associated with the user (e.g., to a smartwatch worn by the user that includes the haptic output device) in response to determining that the content associated with the haptic effect is within the field of view of the user. The haptic output device is configured to receive the haptic signal from the processor and output one or more haptic effects associated with the content in the field of view of the user. In the illustrative embodiment, the haptic output effects can correspond to one or more events relevant to the content in the field of view of the user (e.g., an interaction, action, collision, or other event associated with the content). Thus, for example, the user can perceive haptic effects associated with a particular virtual character that the user is looking at.

In the illustrative embodiment, the sensor may also detect a distance between the display device and the user and transmit a sensor signal corresponding to the distance to the processor, which determines a characteristic of the haptic effect based at least in part on the distance between the user and the display device. For example, the processor may determine a magnitude, duration, frequency, etc. of the haptic effect based on the distance. In this illustrative embodiment, the processor can modify or adjust one or more characteristics of the haptic effect based on the distance between the user and the computing device and transmit the haptic signal to the haptic output device, which outputs the haptic effect. Thus, for example, the user may perceive a stronger haptic effect when the user is close to the display device or a weaker haptic effect when the user is far from the display device.

In the illustrative embodiment, the processor may also determine a characteristic of the haptic effect based at least in part on a virtual or perceived distance between the user and content within the field of view of the user. For example, a size, location, angle, or other characteristic of content displayed via the display device may cause (e.g., by the processor) the content to be perceived by the user as being close to the user or far from the user. As an example, a small virtual character in a scene displayed via the display device may be perceived by the user as being far from the user. In the illustrative embodiment, the processor can determine a magnitude, duration, frequency, etc. of the haptic effect based on the virtual or perceived distance. As an example, the processor determines a strong haptic effect for content within the field of view of the user that the user perceives as being close to the user.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Illustrative Systems for Haptic Feedback Based on a Field of View

FIG. 1 is a block diagram showing a system 100 for haptic feedback based on a field of view according to one embodiment. In the embodiment depicted in FIG. 1, the system 100 comprises a computing device 101 having a processor 102 in communication with other hardware via a bus 106. The computing device 101 may comprise, for example, a mobile device (e.g., a smartphone), tablet, e-reader, smartwatch, a head-mounted display, glasses, a wearable device, a virtual reality computing device, etc.

A memory 104, which can comprise any suitable tangible (and non-transitory) computer-readable medium such as RAM, ROM, EEPROM, or the like, embodies program components that configure operation of the computing device 101. In the embodiment shown, computing device 101 further includes one or more network interface devices 110, input/output (I/O) interface components 112, and storage 114.

Network interface device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate wired or wireless connection to devices such as one or more displays 134, game controllers, keyboards, mice, joysticks, cameras, buttons, speakers, microphones and/or other hardware used to input or output data. Storage 114 represents nonvolatile storage such as magnetic, optical, or other storage media included in computing device 101 or coupled to the processor 102.

In some embodiments, the computing device 101 includes a touch sensitive surface 116. Touch sensitive surface 116 represents any surface that is configured to sense tactile input of a user. One or more touch sensors 108 are configured to detect a touch in a touch area (e.g., when an object contacts the touch sensitive surface 116) and transmit signals associated with the touch to the processor 102. Any suitable number, type, or arrangement of touch sensor 108 can be used. For example, resistive and/or capacitive sensors may be embedded in touch sensitive surface 116 and used to determine the location of a touch and other information, such as pressure, speed, and/or direction.

The touch sensor 108 can additionally or alternatively comprise other types of sensors. For example, optical sensors with a view of the touch sensitive surface 116 may be used to determine the touch position. As another example, the touch sensor 108 may comprise a LED (Light Emitting Diode) finger detector mounted on the side of a display. In some embodiments, touch sensor 108 may be configured to detect multiple aspects of the user interaction. For example, touch sensor 108 may detect the speed, pressure, and direction of a user interaction, and incorporate this information into the signal transmitted to the processor 102. Thus, for example, the computing device 101 can be a smartphone that includes the touch sensitive surface 116 (e.g., a touch sensitive screen) and touch sensor 108 for detecting user input when a user of the smartphone touches the touch sensitive surface 116.

In some embodiments, the computing device 101 comprises a touch-enabled display that combines a touch sensitive surface 116 and a display 134 of the computing device 101. The touch sensitive surface 116 may be overlaid on the display 134, may be the display 134 exterior, or may be one or more layers of material above components of the display 134. In other embodiments, the computing device 101 may display a graphical user interface ("GUI") that includes one or more virtual user interface components (e.g., buttons) on the touch-enabled display and the touch sensitive surface 116 can allow interaction with the virtual user interface components.

In some embodiments, computing device 101 comprises a camera 130. Although the camera 130 is depicted in FIG. 1 as being internal to the computing device 101, in some embodiments, the camera 130 may be external to and in communication with the computing device 101. As an example, the camera 130 may be external to and in communication with the computing device 101 via wired interfaces such as, for example, Ethernet, USB, IEEE 1394, and/or wireless interfaces such as IEEE1 802.11, Bluetooth, or radio interfaces.

In some embodiments, the computing device 101 comprises one or more sensors 132. In some embodiments, the sensor 132 may comprise, for example, gyroscope, an accelerometer, a global positioning system (GPS) unit, a range sensor, a depth sensor, a Bluetooth device, a camera, an infrared sensor, a quick response (QR) code sensor, etc. In some embodiments, the sensor 132 is external to the computing device 101 and in wired or wireless communication with the computing device 101.

In some embodiments, the computing device 101 may comprise a wearable device (e.g., glasses, a headset, etc.) and the sensor 132 may comprise any device for detecting eye gaze, line-of-sight, or field of view of a user of the computing device 101. For example, the sensor 132 can detect a direction of the user's field of view with respect to content (e.g., texts, images, sounds, videos, characters, virtual objects, virtual animations, etc.) displayed on display 134 or another display device (e.g., a display device 136).

As an example, the sensor 132 may include a camera or be incorporated into camera 130. Such a sensor can be configured to capture an image of the eye of the user of the computing device 101, and the processor 102 can determine the direction of the field of view of the user of the computing device 101 relative to content on display 134 or display device 136 based at least in part on the image by using various image processing methods and techniques. In another embodiment, the sensor 132 is configured to monitor movements of an eye of the user or muscles near an eye of the user of the computing device 101 and the processor 102 is configured to determine the direction of the user's field of view relative to content on the display 134 or display device 136 based at least in part on the monitored movements. In still another embodiment, the sensor 132 may be configured to monitor or measure electrical activity of muscles moving the eye of the user of the computing device 101 and the processor 102 can be configured to determine the direction of the user's field of view relative to content on the display 134 or display device 136. In some embodiments, the sensor 132 may include other sensors used to determine a user's intent or volition, including, for example, sensors associated with functional magnetic resonance imaging ("fMRI") or electroencephalogram ("EEG"). In still another embodiment, the sensor 132 may detect the user's eye gaze, line-of sight, or field of view through various methods and techniques, including, for example, analyzing the user's body or head posture. As an example, the sensor 132 can include a head-mounted display or a head-mounted sensor for detecting a motion of the user's head or for detecting the user's head posture and transmitting data about the motion of the user's head or data about the user's head posture to the processor 102, which can determine the direction of the field of view of the user of the computing device 101 based on the data.

In some embodiments, the sensor 132 may detect a location of the display device 136. As an example, the sensor 132 may be a Bluetooth device or other network device configured to detect a location of another Bluetooth display device (e.g., display device 136 can be a Bluetooth display device) by analyzing signal strength between the sensor 132 and the Bluetooth display device. In some embodiments, the sensor 132 may detect a distance between the sensor 132, the computing device 101, or a user of the computing device 101, and the display device 136 (e.g., based on the strength of the Bluetooth signal between the sensor 132 and the display device 136). In some embodiments, the sensor 132 may detect a location of the display device 136 or a distance between the sensor 132, the computing device 101, ora user of the computing device 101, and the display device 136 via any suitable method or technique.

In some embodiments, the processor 102 may be in communication with a single sensor 132 and, in other embodiments, the processor 102 may be in communication with a plurality of sensors 132, for example, a camera, an infrared sensor, and a Bluetooth device. The sensor 132 is configured to transmit sensor signals to the processor 102.

In some embodiments, the system 100 further includes haptic output device 118 in communication with the processor 102. Haptic output device 118 is configured to output a haptic effect in response to a haptic signal. For example, the haptic output device 118 can output a haptic effect in response to a haptic signal from the processor 102. In some embodiments, haptic output device 118 is configured to output a haptic effect comprising, for example, a vibration, a squeeze, a poke, a change in a perceived coefficient of friction, a simulated texture, a stroking sensation, an electrotactile effect, a surface deformation (e.g., a deformation of a surface associated with the computing device 101), and/or a puff of a solid, liquid, or gas. Further, some haptic effects may use multiple haptic output devices 118 of the same or different types in sequence and/or in concert.

Although a single haptic output device 118 is shown in FIG. 1, some embodiments may use multiple haptic output devices 118 of the same or different type to produce haptic effects. Further, in some embodiments, the haptic output device 118 is in communication with the processor 102 and internal to the computing device 101. In other embodiments, the haptic output device 118 is external to the computing device 101 and in communication with the computing device 101 (e.g., via wired interfaces such as Ethernet, USB, IEEE 1394, and/or wireless interfaces such as IEEE 802.11, Bluetooth, or radio interfaces). For example, the haptic output device 118 may be associated with (e.g., coupled to) a wearable device (e.g., a wristband, bracelet, hat, headset, headband, etc.) and configured to receive haptic signals from the processor 102.

In some embodiments, the haptic output device 118 is configured to output a haptic effect comprising a vibration. The haptic output device 118 may comprise, for example, one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

In some embodiments, the haptic output device 118 is configured to output a haptic effect modulating the perceived coefficient of friction of a surface associated with the haptic output device 118. In one embodiment, the haptic output device 118 comprises an ultrasonic actuator. An ultrasonic actuator may vibrate at an ultrasonic frequency, for example 20 kHz, increasing or reducing the perceived coefficient of friction of the surface associated with the haptic output device 118. In some embodiments, the ultrasonic actuator may comprise a piezo-electric material.

In some embodiments, the haptic output device 118 uses electrostatic attraction, for example by use of an electrostatic actuator, to output a haptic effect. The haptic effect may comprise a simulated texture, a simulated vibration, a stroking sensation, or a perceived change in a coefficient of friction on a surface associated with computing device 101 (e.g., the touch sensitive surface 116). In some embodiments, the electrostatic actuator may comprise a conducting layer and an insulating layer. The conducting layer may be any semiconductor or other conductive material, such as copper, aluminum, gold, or silver. The insulating layer may be glass, plastic, polymer, or any other insulating material. Furthermore, the processor 102 may operate the electrostatic actuator by applying an electric signal, for example an AC signal, to the conducting layer. In some embodiments, a high-voltage amplifier may generate the AC signal. The electric signal may generate a capacitive coupling between the conducting layer and an object (e.g., a user's finger or other body part, or a stylus) near or touching the touch sensitive surface 116. Varying the levels of attraction between the object and the conducting layer can vary the haptic effect perceived by a user.

In some embodiments, the haptic output device 118 comprises a deformation device configured to output a deformation haptic effect. The deformation haptic effect may comprise raising or lowering portions of a surface associated with the computing device 101. For example, the deformation haptic effect may comprise raising portions of the touch sensitive surface 116. In some embodiments, the deformation haptic effect may comprise bending, folding, rolling, twisting, squeezing, flexing, changing the shape of, or otherwise deforming a surface associated with the computing device 101. For example, the deformation haptic effect may apply a force on the computing device 101 or a surface associated with the computing device 101 (e.g., the touch sensitive surface 116), causing it to bend, fold, roll, twist, squeeze, flex, change shape, or otherwise deform.

In some embodiments, the haptic output device 118 comprises fluid configured for outputting a deformation haptic effect (e.g., for bending or deforming a surface associated with the computing device 101). For example, the fluid may comprise a smart gel. A smart gel comprises a fluid with mechanical or structural properties that change in response to a stimulus or stimuli (e.g., an electric field, a magnetic field, temperature, ultraviolet light, shaking, or a pH variation). For instance, in response to a stimulus, a smart gel may change in stiffness, volume, transparency, and/or color. In some embodiments, stiffness may comprise the resistance of a surface associated with the computing device 101 (e.g., the touch sensitive surface 116) against deformation. In some embodiments, one or more wires may be embedded in or coupled to the smart gel. As current runs through the wires, heat is emitted, causing the smart gel to expand or contract, which may cause the computing device 101 or a surface associated with the computing device 101 to deform.

As another example, the fluid may comprise a rheological (e.g., a magneto-rheological or electro-rheological) fluid. A rheological fluid comprises metal particles (e.g., iron particles) suspended in a fluid (e.g., oil or water). In response to an electric or magnetic field, the order of the molecules in the fluid may realign, changing the overall damping and/or viscosity of the fluid. This may cause the computing device 101 or a surface associated with the computing device 101 to deform.

In some embodiments, the haptic output device 118 comprises a mechanical deformation device. For example, in some embodiments, the haptic output device 118 may comprise an actuator coupled to an arm that rotates a deformation component. The deformation component may comprise, for example, an oval, starburst, or corrugated shape. The deformation component may be configured to move a surface associated with the computing device 101 at some rotation angles, but not others. The actuator may comprise a piezo-electric actuator, rotating/linear actuator, solenoid, an electroactive polymer actuator, macro fiber composite (MFC) actuator, shape memory alloy (SMA) actuator, and/or other actuator. As the actuator rotates the deformation component, the deformation component may move the surface, causing it to deform. In such an embodiment, the deformation component may begin in a position in which the surface is flat. In response to receiving a signal from processor 102, the actuator may rotate the deformation component. Rotating the deformation component may cause one or more portions of the surface to raise or lower. The deformation component may, in some embodiments, remain in this rotated state until the processor 102 signals the actuator to rotate the deformation component back to its original position.

Further, other techniques or methods can be used to deform a surface associated with the computing device 101. For example, the haptic output device 118 may comprise a flexible surface layer configured to deform its surface or vary its texture based upon contact from a surface reconfigurable haptic substrate (including, but not limited to, e.g., fibers, nanotubes, electroactive polymers, piezoelectric elements, or shape memory alloys). In some embodiments, the haptic output device 118 is deformed, for example, with a deforming mechanism (e.g., a motor coupled to wires), air or fluid pockets, local deformation of materials, resonant mechanical elements, piezoelectric materials, micro-electromechanical systems ("MEMS") elements or pumps, thermal fluid pockets, variable porosity membranes, or laminar flow modulation.

Turning to memory 104, modules 124, 126, 128, and 129 are depicted to show how a device can be configured in some embodiments to provide haptic feedback using a field of view. In some embodiments, modules 124, 126, 128, and 129 may comprise processor executable instructions that can configure the processor 102 to perform one or more operations.

For example, a detection module 124 can configure the processor 102 to monitor the touch sensitive surface 116 via the touch sensor 108 to determine a position of a touch. As an example, the detection module 124 may sample the touch sensor 108 in order to track the presence or absence of a touch and, if a touch is present, to track one or more of the location, path, velocity, acceleration, pressure and/or other characteristics of the touch over time.

In some embodiments, a content provision module 129 configures the processor 102 to provide content (e.g., texts, images, sounds, videos, characters, virtual objects, virtual animations, etc.) to a user (e.g., to a user of the computing device 101 or another user). If the content includes computer-generated images, the content provision module 129 is configured to generate the images for display on a display device (e.g., the display 134 of the computing device 101, the display device 136, or another display communicatively coupled to the processor 102). If the content includes video and/or still images, the content provision module 129 is configured to access the video and/or still images and generate views of the video and/or still images for display on the display device. If the content includes audio content, the content provision module 129 is configured to generate electronic signals that will drive a speaker, which may be part of the display 134 or display device 136, to output corresponding sounds. In some embodiments, the content, or the information from which the content is derived, may be obtained by the content provision module 129 from the storage 114, which may be part of the computing device 101, as illustrated in FIG. 1, or may be separate from the computing device 101 and communicatively coupled to the computing device 101. In some embodiments, the content provision module 129 can cause the processor 102 to transmit content to another device. As an example, the content provision module 129 can generate or access content and cause the processor to transmit the content to the display device 136.

As an example, the content provision module 129 can cause the processor 102 to generate a virtual environment for display on display 134 or the display device 136. The virtual environment can include an environment that is partially or entirely virtual. For example, the virtual environment can include an augmented reality environment, a virtual reality environment, a video game environment, etc. As an illustrative example, the processor 102 can generate a virtual reality environment associated with a video game on the display 134 or the display device 136. The virtual reality environment can include virtual objects (e.g., characters, vehicles, buttons, sliders, knobs, icons, or other user interface components) with which a user of the computing device 101 may interact. For example, the user may interact with the virtual reality environment using a game controller, keyboard, mouse, joystick, etc., which can be communicatively coupled to the computing device 101 via I/O components 112. The processor 102 may receive signals via the I/O components 112 and determine an interaction with and/or manipulation of a virtual object within the virtual reality environment based on the signals from the I/O components 112. The processor 102 may cause the interaction and/or manipulation to occur within the virtual environment. Thus, the user may be able to interact with or manipulate virtual objects in the virtual reality environment.

In some embodiments, the haptic effect determination module 126 represents a program component that analyzes data to determine a haptic effect to generate. The haptic effect determination module 126 may comprise code that selects one or more haptic effects to output using one or more algorithms or lookup tables. In some embodiments, the haptic effect determination module 126 comprises one or more algorithms or lookup tables usable by the processor 102 to determine a haptic effect.

Particularly, in some embodiments, the haptic effect determination module 126 may determine a haptic effect based at least in part on sensor signals received from the sensor 132. For example, the sensor 132 may detect an eye gaze, line-of-sight, or a direction of a field of view of a user of the computing device 101 and transmit a sensor signal to the processor 102. The processor 102 may receive the sensor signal and determine the direction of the eye gaze or field of view of the user. The haptic effect determination module 126 may determine a haptic effect based at least in part on the determined direction of the eye gaze or field of view of the user.

For example, in one embodiment, the haptic effect determination module 126 may cause the processor 102 to access one or more lookup tables or databases that include data corresponding to various haptic effects associated with various content that can be provided by the computing device 101 (e.g., using the content provision module 129). The haptic effect determination module 126 may also cause the processor 102 to access one or more lookup tables or databases that include data corresponding to a position or location of various content displayed by the computing device 101 (e.g., the position or location of the various content that can be displayed via display 134 or display device 136). In this embodiment, the processor 102 can access the one or more lookup tables or databases and select one or more haptic effects associated with the content that the user is looking at based on the determined direction of the eye gaze or field of view of the user. As an example, the processor 102 can determine that the user is looking at, or in the direction of, a particular virtual object or character provided by the computing device 101 via display 134. Based on this determination, the processor 102 can select can select a haptic effect associated with the particular virtual object or character. In some examples, the haptic effect may allow the user to perceive or experience haptic effects relevant to the content that the user is looking at. For instance, if the user is looking at a car that is revving its engine, the haptic effect can include a vibration or a series of vibrations that can allow the user to perceive the revving of the engine.

The processor 102 may also determine that the user is looking at, or in the direction of, content associated with one or more haptic effects and determine a characteristic (e.g., a magnitude, duration, location, type, frequency, etc.) of the haptic effect based on a virtual or perceived distance between the user and the content. For example, in one embodiment, the haptic effect determination module 126 may cause the processor 102 to access one or more lookup tables or databases that include data corresponding to a perceivable or virtual distance between a user and content (e.g., whether the user will perceive the content as being near the user or far from the user) and/or data corresponding to various parameters of the content (e.g., a size, a location on the display device, an angle of display of the content, etc.) that can be used to adjust or modify the perceivable or virtual distance between the user and the content. As an example, a virtual character may be displayed via display 134 as a small virtual character to cause the user to perceive the virtual character as being far from the user. In this illustrative embodiment, the processor 102 can access the one or more lookup tables or databases and determine a virtual or perceivable distance between the user and the content and determine a characteristic of the haptic effect based on the perceived virtual or perceived distance. As an example, the processor 102 can determine that the user is looking at, or in the direction of, a virtual object that is being displayed via display 134 as a small virtual object such that the user perceives the virtual object as being far from the user. The processor 102 can determine a weak haptic effect associated with the virtual object based on the user perceiving the virtual object as being far. Thus, for instance, if the user is looking at a small character that is jumping up and down in the background of a scene (e.g., the user perceives the character is being far from the user), the haptic effect can be a weak vibration.

In another embodiment, the processor 102 can determine that the user is looking at, or in the direction of, multiple content associated with one or more haptic effects. In this embodiment, the haptic effect determination module 126 can cause the processor 102 to determine a haptic effect based on each content that the user is looking at. As an example, the processor 102 can determine that the user is looking at, or in the direction of, a first virtual character provided by the computing device 101 via display 134. Based on this determination, the processor 102 can select a first haptic effect (e.g., a vibration) associated with the first virtual character. The processor 102 can also determine that the user is looking at, or in the direction of, a second virtual character provided by the computing device 101 via display 134 (e.g., the user may be looking at the first and second virtual characters simultaneously if, for instance, the first virtual character is positioned near the second virtual character). Based on this determination, the processor can select a second haptic effect associated with the second virtual character. In some embodiments, the first haptic effect associated with the first virtual character can be different from the second haptic effect associated with the second virtual character. In some embodiments, the processor 102 can select and determine a third haptic effect that includes a combination of a portion of the first haptic effect associated with the first virtual character and a portion of the second haptic effect associated with the second virtual character based on the user looking at, or in the direction of the first and second virtual characters.

In some embodiments, the processor 102 can also select or determine a characteristic of the first, second, or third haptic effect in response to determining that the user is looking at, or in the direction, of various content associated with one or more haptic effects. For example, the processor 102 can determine a magnitude of the first, second, or third haptic effect based on a proportion of the user's field of view directed toward the first virtual character or the second virtual character. As an example, the processor 102 can determine that half of the user's field of view is directed toward the first virtual character and that half of the user's field of view is directed toward the second virtual character. Based on this determination, the processor 102 can adjust a magnitude of the first haptic effect associated with the first virtual character to half the magnitude and adjust a magnitude of the second haptic effect associated with the second virtual character to half the magnitude. Thus, in some examples, the characteristic of the haptic effect perceived by the user of the computing device 101 may be proportional to, or vary depending on, the user's eye gaze, line-of-sight, or a portion of the user's field of view directed toward content displayed by display 134 or display device 136.

In another embodiment, the processor 102 can determine that the user is looking at, or in the direction of, a portion of the display device 136 or display 134 based on sensor signals. For example, the sensor 132 may detect that a direction of the user's eye gaze or field of view is toward a first portion of the display device 136 or display 134 and transmit a sensor signal indicating the direction of the user's eye gaze or field of view to the processor 102. The processor 102 may receive the sensor signal and determine the direction of the eye gaze or field of view of the user. The haptic effect determination module 126 may cause the processor 102 to access one or more lookup tables or databases that include data corresponding to various haptic effects associated with various portions of, or locations on, the display device 136 or display 134. The processor 102 can access the one or more lookup tables or databases and select one or more haptic effects associated with the first portion of the display device 136 or display 134 that the user is looking at or toward. As an example, the processor 102 can determine that the user is looking at, or in the direction of, a left portion of display 134. Based on this determination, the processor 102 can select can select a haptic effect associated with the left portion of display 134. In some examples, the haptic effect may allow the user of the computing device 101 to perceive or experience haptic effects relevant to content being displayed on a portion of the display 134 or display device 136 that the user is looking at. For instance, if the user is looking at a portion of the display 134 where a collision or series of collisions is being displayed, the haptic effect can include a vibration or series of vibrations corresponding to each collision, which can allow the user to experience haptic effects associated with the one or more collisions.

In some embodiments, the processor 102 can determine that the user is looking at, or in the direction of, multiple portions of the display 134 or display device 136. In this embodiment, the haptic effect determination module 126 can cause the processor 102 to determine a haptic effect based on the user looking at multiple portions of the display 134 or display device 136. The processor 102 can also select or determine a characteristic (e.g., a magnitude, duration, location, type, frequency, etc.) of the haptic effect in response to determining that the user is looking at, or in the direction, of the multiple portions of the display 134 or display device 136.

As an example, the processor 102 can determine that the user is looking at, or in the direction of, a first portion of the display 134. The processor 102 can also determine that the user is looking at, or in the direction of, a second portion of the display 134. For example, the first portion can be the top portion of the display 134, the second portion can be the left portion of the display 134, and the user can be simultaneously looking at the first and second portions (e.g., looking at a top-left portion of the display 134). The processor 102 can determine a haptic effect (e.g., a vibration) that can include one or more haptic effects based on the user looking at the first and second portions of the display 134. For example, the processor 102 can select a haptic effect associated with the top portion, left portion, or a top-left portion of the display 134. In some examples, the processor 102 can select a first haptic effect associated with the top portion and a second haptic effect associated with the left portion. In some examples, the haptic effect associated with the top portion of the display 134 can be different from the haptic effect associated with the left portion of the display 134.

In some embodiments, the processor 102 can determine a magnitude of the haptic effect based on a proportion of the user's field of view directed toward the top portion or the left portion of the display 134. As an example, the processor 102 can determine that one-third of the user's field of view is directed toward the top portion of the display 134 and that two-thirds of the user's field of view is directed toward the left portion of the display 134. Based on this determination, the processor 102 can adjust a magnitude of the haptic effect associated with the top portion to one-third of the magnitude and adjust a magnitude of the haptic effect associated with the left portion to two-thirds of the magnitude. Thus, in some examples, the haptic effect or a characteristic of the haptic effect perceived by the user of the computing device 101 may be proportional to, or vary depending on, a proportion of the user's eye gaze, line-of-sight, or field of view directed toward a portion of the display 134 or display device 136.

In this manner, the system 100 for haptic feedback based on a field of view can provide a user with one or more haptic effects relevant to particular content that the user is looking at or relevant to content displayed on a particular portion of a display device that the user is looking at, which can provide the user with a more immersive experience as the user views the content on the display device. Thus, for instance, the user can perceive haptic effects that are relevant to the content that the user is looking at so that the user is not overwhelmed with haptic effects associated with content that the user is not looking at or toward.

In another embodiment, the processor 102 can receive sensor signals from the sensor 132 and determine a distance between the sensor 132, the computing device 101, or a user of the computing device 101, and the display 134 or display device 136 (e.g., based on the strength of the Bluetooth signal between in the sensor 132 and the display 134 or display device 136). In this embodiment, the haptic effect determination module 126 can cause the processor 102 to determine a haptic effect based at least in part on the determined distance. The haptic effect determination module 126 may also cause the processor 102 to select or determine a characteristic (e.g., a magnitude, duration, location, type, frequency, etc.) of the haptic effect based at least in part on the determined distance.

As an example, the processor 102 can determine that the user is near display device 136 or content displayed on display device 136. The processor 102 can determine a haptic effect based on the user being near the display device 136 or content displayed on display device 136. For example, the haptic effect can be a strong or long haptic effect if the user is near the display device 136. As another example, the processor 102 can determine that the user is far from the display device 136 or content displayed on the display device 136 and determine a weak or short haptic effect based on this determination.

In another embodiment, the haptic effect determination module 126 may comprise code that determines a haptic effect based on content provided by the content provision module 129. For example, the content provision module 129 may provide visual content to be output on the display device 136 or display 134. In one embodiment, the haptic effect determination module 126 may determine a haptic effect associated with the visual content. For example, in one such embodiment, the haptic effect determination module 126 may determine a haptic effect for providing a haptic track associated with a video being provided by the display device 136. A haptic track can include a haptic effect (e.g., a vibration) or a series of haptic effects that correspond to the events occurring in the video being provided. For instance, if the video includes a series of explosions, the haptic track can be a series of vibrations that correspond to each explosion. Thus, as the user watches the video, the user may perceive the haptic effects associated with the video.

In some embodiments, the haptic effect determination module 126 may comprise code that determines, based on a location of a touch on the touch sensitive surface 116, a haptic effect to output and code that selects one or more haptic effects to provide in order to simulate the effect. For example, different haptic effects may be selected based on the location of a touch in order to simulate the presence of a virtual object (e.g., a virtual piece of furniture, automobile, animal, cartoon character, button, lever, logo, or person) on the display 134. Further, in some embodiments, haptic effect determination module 126 may comprise code that determines, based on the size, color, location, movement, and/or other characteristics of a virtual object, a haptic effect to output and code that selects one or more haptic effects to provide in order to simulate the effect. For example, haptic effects may be selected based on the color of a virtual object (e.g., a strong vibration if the virtual object is red, and a weaker vibration if the virtual object is green).

In some embodiments, the haptic effect determination module 126 comprises code that determines a haptic effect based on an event. An event, as used herein, is any interaction, action, collision, or other event, which occurs during operation of the computing device 101, which can potentially comprise an associated haptic effect. In some embodiments, an event may comprise user input (e.g., a button press, manipulating a joystick, interacting with a touch sensitive surface 116, tilting or orienting the device), a system status (e.g., low battery, low memory, or a system notification, such as a notification generated based on the system receiving a message, an incoming phone call, a notification, or an update), sending data, receiving data, or a program event (e.g., if the program is a game, a program event may comprise explosions, gunshots, collisions, interactions between game characters, advancing to a new level, or driving over bumpy terrain).

In some embodiments, the haptic effect determination module 126 can cause the processor 102 to select one or more haptic effects to provide, and/or one or more haptic output devices 118 to actuate, in order to generate or output the haptic effect.

In some embodiments, the haptic effect generation module 128 represents programming that causes the processor 102 to generate and transmit haptic signals to a haptic output device 118, 159 to generate the selected haptic effect. In some examples, the haptic effect generation module 128 causes the haptic output device 118 to generate a haptic effect determined by the haptic effect determination module 126. For example, the haptic effect generation module 128 may access stored waveforms or commands to send to the haptic output device 118 to create the selected haptic effect. For example, the haptic effect generation module 128 may cause the processor 102 to access a lookup table that includes data indicating one or more haptic signals associated with one or more haptic effects and determine a waveform to transmit to haptic output device 118 to generate a particular haptic effect. In some embodiments, the haptic effect generation module 128 may comprise algorithms to determine the haptic signal. The haptic effect generation module 128 may comprise algorithms to determine target coordinates for the haptic effect (e.g., coordinates for a location on the computing device 101, such as on the touch sensitive surface 116, at which to output the haptic effect). For example, the haptic effect generation module 128 may cause the processor 102 to use a sensor signal indicating a location of a touch of an object on the touch sensitive surface 116 to determine target coordinates for the haptic effect, which may correspond to the location of the touch. In some embodiments, the haptic output device 118 may include one or more haptic output devices. In such embodiments, the haptic effect generation module 128 may cause the processor 102 to transmit haptic signals to the one or more haptic output devices 118 to generate the selected haptic effect.

In some embodiments, the display device 136 comprises, for example, a mobile device (e.g., a smartphone), tablet, e-reader, smartwatch, a head-mounted display, a wearable device, a video screen, a headset, a virtual reality display device, or any other device that includes a display for providing content.

The display device 136 may include a processor 138, a memory 140, a bus 142, I/O components 144, storage 146, network interface device 148, display 150, touch sensitive surface 152, touch sensors 154, camera 156, sensor 158, and haptic output device 159, each of which may be configured in substantially the same manner as the processor 102, memory 104, bus 106, I/O components 112, storage 114, network interface device 110, display 134, touch sensitive surface 116, touch sensors 108, camera 130, sensors 132, and haptic output device 118 of the computing device 101, although they need not be. In some embodiments, the computing device or the display device 136 may include all or some of the components depicted in FIG. 1. As an example, the computing device 101 can be a smartphone and the display device 136 can be a tablet that a user of the computing device 101 is looking at or toward. In such an example, the computing device 101 or the display device 136 can include all or some of the components depicted in FIG. 1.

The computing device 101 may be communicatively coupled to the display device 136. For example, the computing device 101 and the display device 136 can communicate (e.g., transmit or receive data or signals 172, 174) using network interface devices 110 and 148. As an example, the computing device 101 and the display device 136 can each be connected to a common wireless network and can communicate via the wireless network. As another example, the computing device 101 and the display device 136 can be communicatively coupled via a Bluetooth connection.

In some embodiments, the display device 136 may be a display device that can be used to provide content to a user of the computing device 101 or display device 136. For example, the display device 136 can be used to provide texts, images, sounds, videos, characters, virtual objects, virtual animations, etc. As an example, the display device 136 can be used to provide a virtual environment (e.g., an augmented reality environment, a virtual reality environment, a video game environment, etc.) to the user. As an illustrative example, the display device 136 may provide a virtual reality environment that includes virtual objects (e.g., characters, vehicles, buttons, sliders, knobs, icons, or other user interface components) with which the user may interact. For example, the user may interact with the virtual reality environment using the computing device 101 or one or more game controllers communicatively coupled to the computing device 101 or display device 136 via I/O components 112, 144. The processors 102, 138 may receive signals from the game controllers via the I/O components 112, 144 and determine an interaction with and/or manipulation of a virtual object within the virtual reality environment based on the signals from the I/O components 112, 144. The processor 102, 138 may cause the interaction and/or manipulation to occur within the virtual environment. As an illustrative example, the computing device 101 can be a smartphone and the display device 136 can be a virtual reality display device that is displaying one or more virtual objects. A user of the smartphone may be looking at or toward the virtual objects displayed by the virtual reality display device and the user may interact with or control the virtual objects that the user is looking at by providing one or more user inputs to the smartphone, which can be communicated to the virtual reality display device by the smartphone. Thus, the user may be able to interact with or manipulate virtual objects in a virtual reality environment.

In some embodiments, the sensor 158 of the display device 136 may detect an eye gaze, line-of-sight, or field of view of a user of the computing device 101 or display device 136. For example, the sensor 158 may be configured in substantially the same manner as sensor 132 for detecting the eye gaze, line-of-sight, or field of view of a user of the computing device 101 or display device 136.

In some embodiments, the memory 140 includes modules 160, 162, 164, 166. In some embodiments, the memory 140 includes all or some of the modules 160, 162, 164, 166. The modules 160, 162, 164, 166 can each be configured in substantially the same manner as respective modules 124, 126, 128, and 129 of the computing device 101.

In some embodiments, the content provision module 166 can be configured in substantially the same manner as the content provision module 129 and can configure the processor 138 to provide content (e.g., texts, images, sounds, videos, animated graphics, virtual objects, virtual animations, etc.) to a user (e.g., to a user of the computing device 101 or another user). In some embodiments, the content, or the information from which the content is derived, may be obtained from another device (e.g., the computing device 101). For example, the content provision module 166 can be configured to cause the processor 138 to receive data that includes content from the computing device 101. The content may displayed by the display device 136 (e.g., via the display 150).

In some embodiments, the haptic effect determination module 162 may cause the processor 138 to determine a haptic effect based at least in part on sensor signals received from the sensor 158 in substantially the same manner as described above with respect to haptic effect determination module 126 and processor 102. For example, the haptic effect determination module 162 may cause the processor 138 to determine one or more haptic effects based on the direction of the eye gaze or field of view of the user of the computing device 101. As an example, the haptic effect determination module 162 may cause the processor 138 to determine one or more haptic effects in response to determining that the user is looking at, or in the direction of, content associated with a haptic effect and displayed on display device 136. As another example the haptic effect determination module 162 may cause the processor 138 to determine one or more haptic effects in response to determining that the user is looking at, or in the direction of, a portion of the display device 136. As another example, the haptic effect determination module 162 can cause the processor 138 to determine a characteristic of the haptic effect based on the direction of the eye gaze or field of view of the user of the computing device 101 or display device 136. In another embodiment, the haptic effect determination module 162 can cause the processor 138 to determine a characteristic of the haptic effect based on a virtual or perceived distance between the user and the content. In another embodiment, the haptic effect determination module 162 can cause the processor 138 to determine a characteristic of the haptic effect based on a distance between a user of the computing device 101 or display device 136 and the display device 136 or sensor 158. Further, in some embodiments, the haptic effect determination module 162 can cause the processor 102 to select one or more haptic effects to provide, and/or one or more haptic output devices 118 to actuate, in order to generate or output the haptic effect.

In some embodiments, the haptic effect generation module 164 represents programming that causes the processor 138 to generate and transmit haptic signals to haptic output device 118 or 159 to generate the selected haptic effect. In some examples, the haptic effect generation module 164 causes the haptic output device 118, 159 to generate a haptic effect determined by the haptic effect determination module 162.

As an illustrative example, the computing device 101 can be a smartwatch and the display device 136 can be a tablet that a user wearing the smartwatch is looking at. In one such example, the tablet can display content to the user via a display of the tablet (e.g., using the content provision module 166 to provide content via display 150) and the sensor 158 can determine a direction of the eye gaze of the user. The processor of the tablet (e.g., processor 138) can determine a haptic effect in response to determining that the user is looking at content displayed by the tablet and associated with a haptic effect. The processor of the tablet can generate and transmit a haptic signal to a haptic device of the smartwatch (e.g., haptic device 118) or a haptic device of the tablet (e.g., haptic output device 159) to generate a haptic effect to be perceived by the user. For example, the haptic effect may be output by the smartwatch or the tablet and the user may perceive the haptic effect as the user is wearing the smartwatch or if the user is in contact with the tablet (e.g., touching or holding the tablet).

Figure 2:
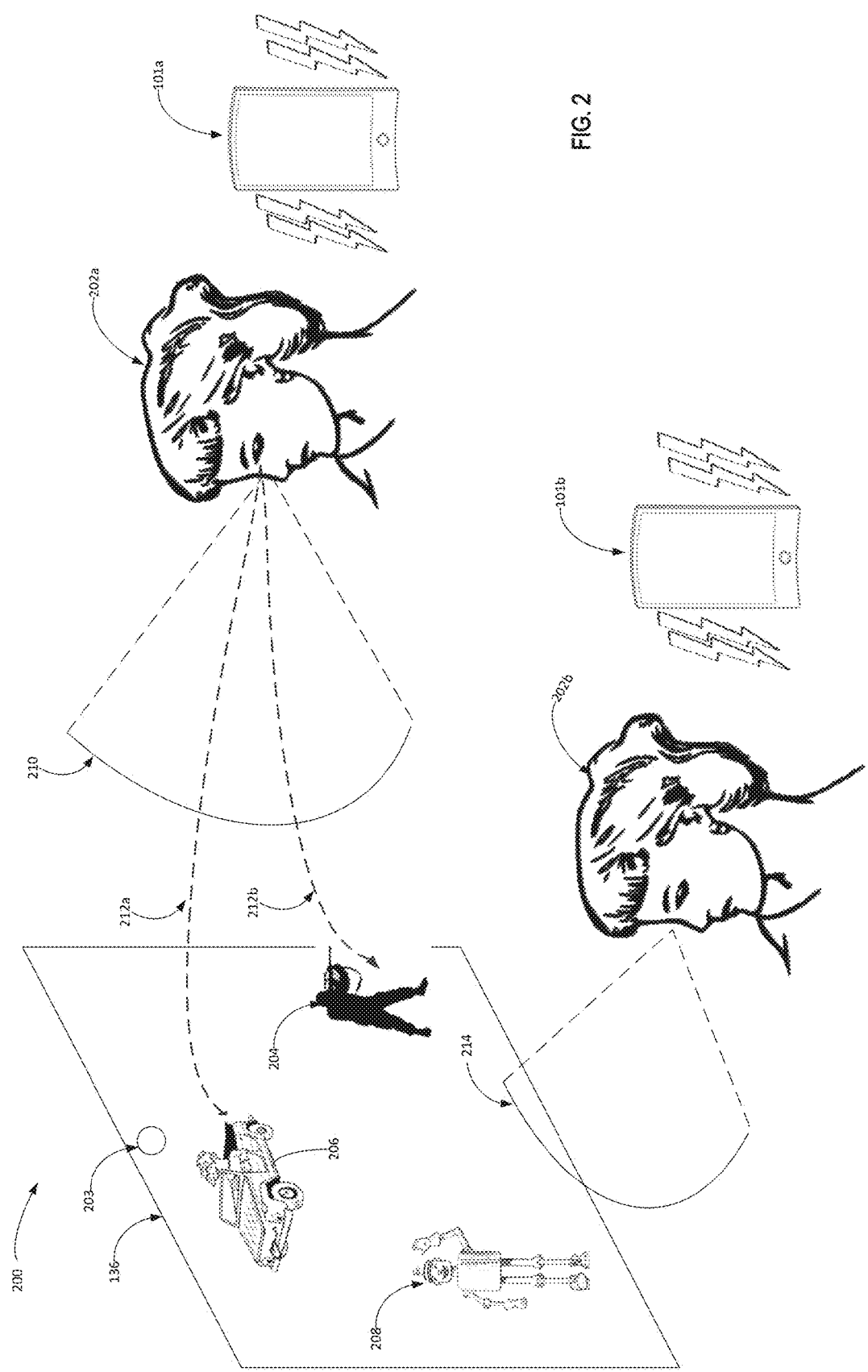
FIG. 2 shows an embodiment of a system for haptic feedback using a field of view according to one embodiment.

FIG. 2 shows an embodiment of a system 200 for haptic feedback using a field of view. The system 200 includes computing devices 101a-b (e.g., the computing device 101 of FIG. 1) and a display device 136.

In the example shown in FIG. 2, the display device 136 can be any display device (e.g., a video screen) configured to display content to users 202a-b of computing devices 101a-b. For example, the processor of the display device 136 may generate content to be displayed by display device 136. In another example, the processor of the computing device 101 (e.g., the processor 102 of FIG. 1) may generate content and transmit data that includes content to the display device 136 and the display device 136 can be configured to display the content.

In some embodiments, the display device 136 or the computing devices 101a-b may determine one or more haptic effects associated with the content displayed on the display device 136. For example, the content may comprise a video, or a video game, and the computing devices 101a-b may output one or more haptic effects (e.g., via the haptic output device 118 of FIG. 1) that correspond to the video game or video content displayed on the display device 136. As an example, the video content may include one or more actions or interactions (e.g., interaction between characters or objects in the video displayed by display device 136). The computing devices 101a-b can output one or more vibrations associated with the actions or interaction so that the users 202a-b may perceive the actions and/or interactions as they are displayed on the display device 136.

In some embodiments, the display device 136 comprises a sensor 203, which may be configured in substantially the same manner as the camera 156 or the sensor 158 of FIG. 1. In some embodiments, the sensor 203 may be internal to the display device 136 or external to the display device 136 and communicatively coupled to the display device 136 (e.g., via a wired or wireless communication link). The sensor 203 may be configured to detect a line-of-sight or field of view 210 of the user 202a or a direction of an eye gaze 212a-b of the user 202a. The sensor 158 may also detect a line-of-sight or field of view 214 of the user 202b.

In some embodiments, sensor 203 may transmit data indicating a detected line-of-sight or field of view 210 of the user 202a, the direction of an eye gaze 212a-b of the user 202a, or the line-of-sight or field of view 214 of the user 202b. For example, the sensor 203 may detect a field of view 210 of the user 202a or the direction of the eye gaze 212a-b of the user 202a. The sensor 203 may transmit a sensor signal indicating the field of view 210 of the user 202a or the direction of the eye gaze 212a-b to a processor of the display device 136 (e.g., the processor 138 of FIG. 1), which may determine the field of view 210 of the user 202a or the direction of the eye gaze 212a-b based on the data.

In some embodiments, the display device 136 may determine one or more haptic effects based at least in part on the sensor signal from the sensor 203. The haptic effects may each comprise a vibration or any other haptic effect. For example, in some embodiments, the display device 136 may determine a haptic effect based on the field of view 210 of the user 202a or the direction of the eye gaze 212a-b of the user 202a. In one such embodiment, the display device 136 determines that the user 202a is looking at, or in the direction of, virtual objects 204, 206 displayed via display device 136, based on the data from the sensor 203 and may determine a first haptic effect (e.g., a vibration) associated with virtual object 204 and a second haptic effect (e.g., another vibration) associated with virtual object 206. In some embodiments, the first haptic effect can be different from the second haptic effect. The display device 136 may transmit a first haptic signal corresponding to the first haptic effect and/or a second haptic signal corresponding to the second haptic effect to a haptic output device associated with the user 202a. For example, the display device 136 may transmit the first or second haptic signal to the computing device 101a associated with the user, which includes a haptic output device (e.g., the haptic output device 118 of FIG. 1). The haptic output device can output the first and second haptic effects to the user 202a (e.g., to a wrist, hand, arm, leg, or hand of the user 202a). The first or second haptic effect may allow the user to perceive or experience haptic effects relevant to the virtual objects 204, 206. For example, if virtual object 204 is a virtual character that is jumping up and down, the first haptic effect associated with the virtual object 204 can include one or more vibrations that allow the user 202a to perceive the effects of the virtual object 204 jumping up and down.

The display device 136 may also determine a characteristic (e.g., a magnitude, duration, location, type, frequency, etc.) of the one or more haptic effects based at least in part on a size, color, location, movement, and/or other characteristic of the virtual objects 204, 206, 208. For example, in the example depicted in FIG. 2, the virtual objects 204, 206 are within the field of view 210 of the user 202a. The virtual object 206 may be displayed on display device 136 as a three-dimensional ("3D") virtual object. In this example, the display device 136 may determine a strong or long first haptic effect (e.g., a strong or long vibration) associated with the virtual object 206 based on the virtual object 206 being displayed as a 3D virtual object. The display device 136 can transmit a first haptic signal associated with the first haptic effect to the computing device 101a and the haptic output device of the computing device 101a can output the haptic effect to the user 202a. Thus, in some examples, the characteristic of the haptic effect perceived by the user 202a may be proportional to, or vary depending on, a characteristic of the virtual objects 204, 206 within the field of view 210 of the user 202a.

In some embodiments, the display device 136 may determine a characteristic of the one or more haptic effects based on the eye gaze 212a-b of the user 202a-b. For example, the display device 136 can determine a characteristic of the haptic effects based on a change in the eye gaze 212a-b of the users 202a-b.

For example, in the example depicted in FIG. 2, the virtual objects 204, 206 are within the field of view 210 of the user 202a, and the eye gaze of the user 202a may pan or move between the virtual objects 204, 206. In this example, the computing device 101a may include a first haptic output device and a second haptic output device. In some examples, the first and second haptic output devices can be combined to form a single haptic output device. The first haptic output device can be configured to output a haptic effect to a first part of the user (e.g., a right wrist, right hand, right arm, or a right side of the head of the user 202a). And the second haptic output device can be configured to output a haptic effect to a second part of the user (e.g., a left wrist, left hand, left arm, or a left side of the head of the user 202a). The eye gaze 212a of the user 202a may initially be directed toward the virtual object 206, which may be displayed on the display device 136 toward the right of the user 202a. The display device 136 may transmit a first haptic signal corresponding to a first haptic effect to the first haptic output device of the computing device 101a in response to the eye gaze 212a of the user 202a being directed toward the virtual object 206. The first haptic output device can output the first haptic effect to a right side of the user 202a (e.g., a right arm of the user 202a). In some examples, the first haptic effect can be a strong haptic effect (e.g., a strong vibration) in response to the eye gaze 212a of the user 202a being directed toward the virtual object 206.

Subsequently, the eye gaze of the user 202a may shift such that eye gaze 212b of the user 202a may be directed toward the virtual object 204, which may be displayed on the display device 136 toward the left of the user 202a. As the eye gaze of the user 202a shifts from the virtual object 206 to the virtual object 204 (e.g., from eye gaze 212a to 212b), the display device 136 may transmit a second haptic signal corresponding to a second haptic effect to the second haptic output device of the computing device 101. The second haptic output device can output the second haptic effect to a left side of the user 202a (e.g., the left arm of the user 202a).

In this example, the display device 136 can adjust a characteristic of the first haptic effect as the eye gaze of the user 202a shifts from eye gaze 212a to eye gaze 212b. For example, the display device 136 may reduce a magnitude of the first haptic effect and/or increase a magnitude of the second haptic effect as the eye gaze of the user shifts from the virtual object 206 to the virtual object 204 (e.g., from eye gaze 212a to 212b). In some examples, the first haptic effect can comprise a single haptic track. For example, the haptic track can be a series of haptic effects (e.g., a series of vibrations) that includes the first haptic effect and the second haptic effect. In this example, the display device 136 can adjust a characteristic (e.g., a magnitude) of the haptic track as the eye gaze of the user 202a shifts from eye gaze 212a to eye gaze 212b as described above.

Thus, in some examples, a characteristic of a haptic effect perceived by a user 202a-b may vary as the eye gaze of the user 202a-b changes. In another example, the user 202a-b may perceive various haptic effects corresponding to a horizontal and/or vertical position of the content that the user 202a-b is looking at on the display device 136. For example, as described above, the user 202a may perceive a haptic effect on the left side of the user 202a if the user 202a is looking at content displayed on the display device 136 to the left of the user 202a.

In some embodiments, the display device 136 may determine a characteristic of one or more haptic effects based on a virtual or perceived distance between the user and the content that the user is looking at, in the direction of, or toward. For example, in the example depicted in FIG. 2, the virtual objects 204, 206 are within the field of view 210 of the user 202a. The virtual object 206 may be displayed on display device 136 as a smaller virtual object than virtual object 204, which may cause the user 202a to perceive the virtual object 206 as being far and to perceive the virtual object 204 as being close. In this example, the display device 136 may determine a strong or long first haptic effect (e.g., a strong or long vibration) associated with the virtual object 204. As another example, the display device 136 may determine a weak or short second haptic effect (e.g., a weak or short vibration) associated with the virtual object 206. The display device 136 can transmit a first haptic signal associated with the first haptic effect or a second haptic signal associated with the second haptic effect to the computing device 101a and the haptic output device of the computing device 101a can output the haptic effects to the user 202a. Thus, in some examples, the characteristic of the haptic effect perceived by the user 202a may be proportional to, or vary depending on, a virtual or perceived distance between the user 202a and virtual objects 204, 206 within the field of view 210 of the user 202a.

In another embodiment, the sensor signal from the sensor 203 can indicate that the user 202a is looking at, or in the direction of, multiple virtual objects 204, 206. For example, in the example depicted in FIG. 2, data from sensor 203 can indicate that a direction of an eye gaze 212a of the user 202a is toward, or in the direction of, virtual object 206 and that a direction of an eye gaze 212b of the user 202a is toward, or in the direction of, virtual object 204. For instance, the virtual object 204 can be near the virtual object 206 and the user 202a may be looking at virtual objects 204, 206 simultaneously. In one such embodiment, the display device 136 can determine a third haptic effect. In some embodiments, the third haptic effect may be different from the first and second haptic effects. In another embodiment, the third haptic effect can include a combination of the first and second haptic effects. For example, the third haptic effect may include a portion of the first haptic effect associated with the virtual object 204 and a portion of the second haptic effect associated with the virtual object 206.

In some embodiments, the display device 136 can determine a characteristic of the first haptic effect associated with the virtual object 204 and a characteristic of the second haptic effect associated with the virtual object 206 based on the direction of the eye gaze 212a-b of the user 202a. For example, the display device 136 can determine that a portion of the user's field of view 210 corresponding to the direction of the eye gaze 212a of the user 202a is greater than a portion of the user's field of view 210 corresponding to the direction of the eye gaze 212b of the user 202a. For example, the display device 136 may determine that three-fourths of the user's field of view 210 is directed toward the virtual object 206 based on the direction of the eye gaze 212a of the user 202a. The display device 136 may also determine that one-fourth of the user's field of view 210 is directed toward the virtual object 204 based on the direction of the eye gaze 212b of the user 202a. Based on this determination, the display device 136 can adjust a magnitude of the first haptic effect associated with the virtual object 204 to one-fourth of the magnitude. The display device 136 can also adjust a magnitude of the second haptic effect associated with the virtual object 206 to three-fourths of the magnitude. In this manner, the user 202a may perceive the second haptic effect more than the first haptic effect if the user 202a is more focused on the virtual object 206 than the virtual object 204. Thus, in some examples, the characteristic of the haptic effect perceived by the user 202a may be proportional to, or vary depending on, the eye gaze 212a-b of the user 202a or a portion of the user's field of view 210 directed toward virtual objects 204, 206.

In some embodiments, the sensor signal from the sensor 203 can indicate a distance between the user 202a and the display device 136 or virtual objects 204, 206 within the field of view 210 of the user 202a. In one such embodiment, the display device 136 may determine a haptic effect or a characteristic of the haptic effect based on the distance between the user 202a and the display device 136 or virtual objects 204, 206. As an example, the display device 136 may determine a strong or long first haptic effect (e.g., a strong or long vibration) associated with the virtual object 204 if the user 202a is near the virtual object 204. As another example, the display device 136 may determine a weak or short second haptic effect associated with the virtual object 206 if the user 202a is far from the virtual object 206. The display device 136 can transmit a haptic signal associated with the haptic effect to the haptic output device associated with the user 202a, which can output the haptic effect to the user 202a.

In the example depicted in FIG. 2, the field of view 214 of the user 202b is directed toward virtual object 208. The sensor 203 may transmit sensor signals indicating the direction of the field of view 214 and the display device 136 can determine a haptic effect associated with the virtual object 208. The display device 136 can transmit a haptic signal associated with the haptic effect to a haptic output device associated with the user 202b, which can output the haptic effect to the user 202b.

In some embodiments, the users 202a-b may not perceive a haptic effect associated with a virtual object 204, 206, 208 that is outside of the field of view 210, 214 of the users 202a-b. For example, data from sensor 203 may indicate that virtual objects 204, 206 are outside the field of view 214 of the user 202b (e.g., the user 202b is not looking at, toward, or in the direction of virtual objects 204, 206). In one such embodiment, a haptic effect associated with virtual objects 204, 206 may not be output to the user 202b. In this manner, sensor signals from the sensor 203 can be used to provide haptic effects to users 202a-b based on the field of view 210, 214 of the users 202a-b, which can provide the users 202a-b with a more immersive experience relative to content that the users 202a-b are looking at by allowing the users 202a-b to perceive or experience haptic effects relevant to the particular content that the users 202a-b are looking at or toward.

In some embodiments, the display device 136 may determine one or more haptic effects based on sensor signals from the sensor 203 as described above. In another embodiment, the sensor 203 can transmit sensor signals to computing devices 101a-b, each of which can determine one or more haptic effects based on sensor signals in substantially the same manner as described above with reference to the display device 136. For example, the sensor 203 can transmit a sensor signal indicating the field of view 210, 214 of the users 202a-b or the direction of the eye gaze 212a-b of the user 202a to a processor of each computing device 101a-b (e.g., the processor 102 of FIG. 1) and the computing devices 101a-b can determine one or more haptic effects based on the sensor signal. In such embodiments, the computing devices 101a-b may determine a haptic effect based on the sensor signal from the sensor 203 and transmit a haptic signal associated with the haptic effect to a haptic output device associated with the users 202a-b (e.g., haptic output device 118 of FIG. 1), which can output the haptic output effect to the users 202a-b.

While in this example, the users 202a-b may not perceive haptic effects associated with a virtual object 204, 206, 208 that is outside of the field of view 210, 214 of the users 202a-b, the present disclosure is not limited to such configurations. Rather, in other examples, such as, for example, embodiments described in further detail below, the display device 136 or the computing device 101a-b may determine and output one or more haptic effects based on content outside of the field of view 210, 214 of the users 202a-b.

Figure 3:
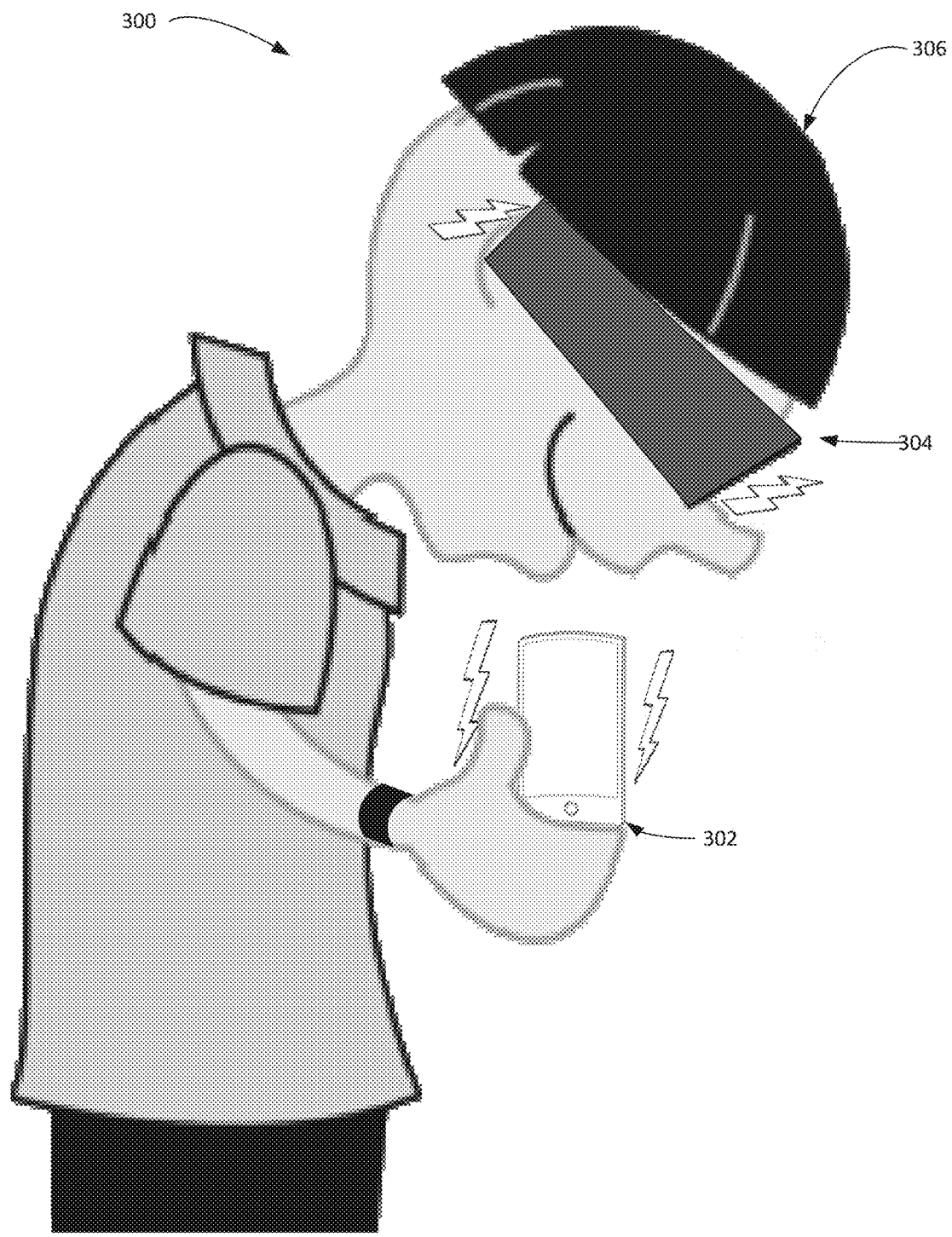
FIG. 3 shows another embodiment of a system for haptic feedback using a field of view according to another embodiment.

FIG. 3 shows another embodiment of a system 300 for haptic feedback using a field of view according to another embodiment. In the example depicted in FIG. 3, the system 300 comprises a computing device 302, such as a smartphone, a tablet, or a game controller, and a display device 304. The display device 304 depicted in FIG. 3 can be a wearable device (e.g., a virtual reality headset).

In this embodiment, the display device 304 generates and provides a virtual environment (e.g., a virtual reality environment associated with a video game) to a user 306 of the display device 304. The virtual environment includes one or more virtual objects (e.g., characters, vehicles, buttons, sliders, knobs, icons, or other user interface components) with which the user 306 can interact using the computing device 302. As an example, the computing device 302 can include one or more buttons, joysticks, etc. communicatively coupled to the computing device 302 via one or more I/O components (e.g., I/O components 112 of FIG. 1). The computing device 302 can be communicatively coupled to the display device 304 to allow the user 306 interact with the virtual environments via the I/O components included in the computing device 302.

In some embodiments, the display device 304 comprises a sensor (not shown), which may detect a field of view of the user 306, or a direction of an eye gaze of the user 306 (e.g., when the user 306 is looking in at a particular portion of the display device 304 or at a particular virtual object displayed by display device 304). For example, the sensor may be a camera or other sensor configured in substantially the same manner as sensor 132 or 158 of FIG. 1. As another example, the sensor can detect a motion of the head of the user 306 or the head posture of the user 306 for determining a field of view of the user 306, or the direction of the eye gaze of the user 306. The sensor can transmit sensor signals to a processor of the display device 304 (not shown) or a processor of the computing device 302 (not shown), which may determine that the field of view or direction of an eye gaze of the user 306 corresponds with a location or position of a virtual object displayed via display device 304. In some embodiments, the display device 304 or the computing device 302 may determine one or more haptic effects (e.g., a vibration, a squeeze, or a poke) associated with the virtual object and output the haptic effect to a body part of the user 306 (e.g., the user's head, hand, or other body part). In some embodiments, outputting a haptic effect associated with a virtual object within the field of view or direction of an eye gaze of the user 306 can allow the user to perceive haptic effects relevant to a virtual object that the user 306 is looking at. As an example, the display device 304 is displaying multiple virtual characters and the user 306 is looking at a particular virtual character engaged in combat. The sensor signals can indicate that the user is looking at the particular virtual character and the display device 304 can output a haptic effect associated with the virtual character being engaged in combat (e.g., via haptic output device 159 of FIG. 1). The haptic effect can include a vibration or a series of vibrations to allow the user 306 to perceive haptic effects associated with the particular virtual character that the user 306 is looking at.

In some embodiments, the display device 304 can determine that the user is looking at multiple virtual objects displayed on display device 304 and the display device 304 can determine a haptic effect associated with each virtual object or a characteristic of the haptic effect associated with each virtual object based on this determination. As an example, the user 306 is looking at a first virtual character and a second virtual character simultaneously. The sensor signals indicate that an eye gaze of the user 306 is directed at the first virtual character and the second virtual character is within the field of view of the user 306. The display device 304 can determine and output one or more haptic effects that include a portion of a first haptic effect associated with the first virtual character and a portion of a second haptic effect associated with the second virtual character. In this manner, the user 306 may experience haptic effects associated with both the first and second virtual characters that the user 306 is looking at.

The display device 304 may also determine a characteristic of the haptic effect based on a virtual or perceived distance between the user 306 and a particular virtual object that the user 306 is looking at or toward. As an example, the display device 304 is displaying a war scene that includes multiple virtual characters engaged in combat. In this example, a first virtual character is engaged in combat and is displayed on the display device 304 such that the user 306 perceives the first virtual character as being near the user 306 (e.g., the first virtual character is displayed as a large virtual character so that the user 306 perceives the first virtual character as being close to the user 306). A second virtual character is engaged in combat in a background of the war scene and displayed on the display device 304 such that the user 306 perceives the second virtual character as being far from the user 306 (e.g., the second virtual character is displayed as a small virtual character so that the user 306 perceives the second virtual character as being far from the user 306). The display device 304 can determine a first haptic effect (e.g., a strong vibration) associated with the first virtual character based on the user 306 perceiving the first virtual character as being near the user 306. The display device 304 may also determine a second haptic effect (e.g., a weak vibration) associated with the second virtual character based on the user 306 perceiving the second virtual character as being far from the user 306.

In some embodiments, the display device 304 can determine that the user 306 is looking at a portion of the display device 304 based on sensor data (e.g., data from the sensor of the display device 304). The display device 304 may determine one or more haptic effects associated with the portion of the display device 304 that the user 306 is looking at. As an example, the display device 304 is divided into a left portion, a middle portion, and a right portion (not shown). The sensor data indicates that the user 306 is looking at the right portion of the display device 304, which includes a scene involving a series of collisions. The display device 304 can output a haptic effect associated with the right portion of the display device 304 and the series of collisions displayed on the right portion (e.g., a series of vibrations) to allow the user 306 to experience haptic effects associated with the collisions displayed on the right portion of the display device 304. In the embodiment depicted in FIG. 3, the display device 304 comprises a wearable device (e.g., a virtual reality headset) and may comprise one or more haptic output devices. The display device 304 may be configured to output the haptic effect to a right side of the display device 304 or to a right side of the body of the user 306 (e.g., to the right side of the head of user 306) in response to determining that the user 306 is looking at the right portion of the display device 304.

In some examples, the display device 304 can include one or more sensors or emitters that can each be configured in substantially the same manner as sensor 203 of FIG. 2. The various sensors or emitters can be positioned at various locations within or on the display device 304 and the locations of the sensors may correspond to various portions of the display device 304. As an example, a first sensor can be positioned near a left portion of the display device 304, a second sensor can be positioned near a middle portion of the display device 304, and a third sensor can be positioned near a right portion of the display device 304. Each sensor can detect a motion of the head of the user 306, the head posture of the user 306, a field of view of the user 306, or a direction of an eye gaze of the user 306. In some such embodiments, each sensor can transmit sensor signals to a processor of the display device 304 (not shown) or a processor of the computing device 302 (not shown), which may determine that the field of view or direction of an eye gaze of the user 306 corresponds with a location or position of the sensor and a portion of the display device 304 associated with sensor (e.g., a portion of the display device 304 near the sensor). The display device 304 or the computing device 302 may determine one or more haptic effects (e.g., a vibration, a squeeze, or a poke) associated with the portion of the display device 304 associated with the sensor and output the haptic effect to a body part of the user 306. In this manner, the display device 304 can determine and output haptic effects based on spatial data, such as, for example, a location of a sensor relative to a portion of the display device 304, and the direction of the eye gaze or field of view of the user 306 corresponding to the location of the sensor.

As an example, the display device 304 is divided into a left portion, a middle portion, and a right portion. A sensor positioned near the left portion detects the direction of the eye gaze of the user 306 and transmits sensor data indicating that the user 306 is looking at or toward the left portion of the display device 304, which includes a scene depicting a series of explosions. The display device 304 can output a haptic effect associated with the left portion of the display device 304 and the series of explosions displayed on the left portion (e.g., a series of vibrations) to allow the user 306 to experience haptic effects associated with the explosions displayed on the left portion of the display device 304. In this manner, the display device 306 can use the sensor to detect the eye gaze or direction of field of view of the user 306 and use spatial data about the sensor (e.g., coordinates of a location of the sensor or a position of the sensor relative to a portion of the display device 304) to determine one or more haptic effects that are relevant to the portion of the display device that the user 306 is looking at or toward.

In some embodiments, the display device 304 can determine that the user is simultaneously looking at more than one portion of the display device 304 and the display device 304 can determine a haptic effect associated with each portion of the display device 304 or a characteristic of each haptic effect based on this determination. As an example, the user 306 is looking at the left portion of the display device 304, which includes a scene involving a virtual character engaged in combat. The user 306 is simultaneously looking at the middle portion of the display device 304, which includes a scene involving a car revving its engine. The sensor signals indicate that a field of view of the user 306 is directed toward the left and middle portions. The display device 304 can determine and output one or more haptic effects based on the sensor signal. For example, the display device 304 can output a first haptic effect associated with the left portion (e.g., a vibration corresponding to the virtual character being engaged in combat). The display device 304 can output a second haptic effect associated with the middle portion (e.g., a series of vibrations corresponding to the car revving its engine). In some embodiments, a single haptic effect may comprise the first and second haptic effects. In this manner, the user 306 may experience haptic effects associated with both the left and middle portions of the display device 304 that the user 306 is looking at.

In the example depicted in FIG. 3, the display device 304 may determine and output one or more haptic effects based on sensor data as described above. In another embodiment, the display device 304 may determine one or more haptic effects and transmit a haptic signal associated with the haptic effects to the computing device 302, which can include a haptic output device configured to output the haptic effect to the user 306. In still another embodiment, the sensor of the display device 304 may transmit sensor signals to the computing device 302, which can determine one or more haptic effects based on the sensor signals and output the haptic effects to the user 306 in substantially the same manner as described above with respect to the display device 304.

While in the example described in FIG. 3, the display device 304 can determine one or more haptic effects based on the field of view of the user 306 or a direction of an eye gaze of the user 306, the present disclosure is not limited to such configurations. Rather, in other examples, the display device 304 can determine one or more haptic effects based one or more events (e.g., an interaction, action, collision, or other event associated with content provided by the display device 304).

For example, the display device 304 may generate and provide a virtual environment that includes one or more virtual objects with which the user 306 can interact as described above. In some examples, one or more of the virtual objects may be displayed outside of the field of view of the user 306 (e.g., behind the user 306 or in front of the user 306, but outside of the field of view of the user 306). In this example, the display device 304 can determine one or more haptic effects based on the content (e.g., the virtual objects) displayed outside the field of view of the user 306. As an example, the display device 304 is displaying a scene involving various virtual characters engaged in combat and the user 306 is looking at a particular virtual character engaged in combat. The display device 304 can output a first haptic effect associated with the particular virtual character being engaged in combat and the user 306 can perceive the first haptic effect. The first haptic effect can be a strong vibration to allow the user 306 to perceive haptic effects associated with the particular virtual character that the user 306 is looking at. The display device 304 may also determine and output a second haptic effect associated with other virtual characters engaged in combat outside the field of view of the user 306 (e.g., virtual characters engaged in combat in a portion of the scene behind the user 306 or virtual characters engaged in combat in a portion of the scene in front of the user 306 and outside the field of view of the user 306). The second haptic effect can be a weak vibration that can allow the user 306 to perceive haptic effects associated with virtual characters engaged in combat behind the user 306 or virtual characters engaged in combat in front of the user, but outside of the field of view of the user 306. In this manner, the user 306 may experience haptic effects associated with a particular virtual character that the user is looking at and other virtual characters outside the field of view of the user.

Figure 4:
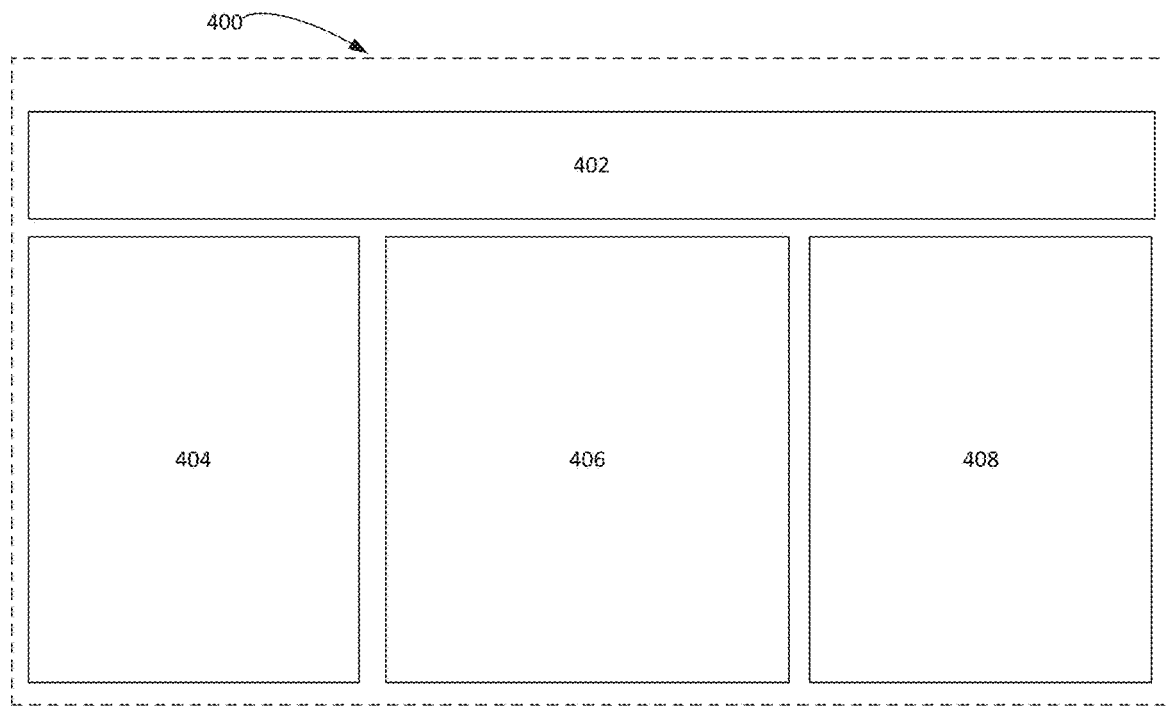
FIG. 4 shows an embodiment of a system for haptic feedback using field of view according to another embodiment.

FIG. 4 shows an embodiment of a system for haptic feedback using field of view according to another embodiment.

As described above, in some examples, one or more haptic effects can be determined based at least in part on sensor data indicating that a user is looking at a portion of a display device (e.g., the display device 136 of FIGS. 1 and 2 or the display device 304 of FIG. 3). In the example depicted in FIG. 4, a display device 400 is shown as being divided into a first portion 402 (e.g., a top portion of the display device 400), a second portion 404 (e.g., a left portion of the display device 400), a third portion 406 (e.g., a middle portion of the display device 400), and a fourth portion 408 (e.g., a right portion of the display device 400). In this example, the display device 400 can be configured in substantially the same manner as the display device 136 of FIG. 1 and a processor of the display device 400 can determine that a user (not shown) is looking at the first portion 402, the second portion 404, the third portion 406, or the fourth portion 408 based on sensor data (e.g., data from a sensor of the display device 400). The display device 400 can determine one or more haptic effects or haptic tracks associated with the portion of the display device 304 that the user is looking at.

As an example, the display device 400 can be a head-mounted display device that includes a sensor for detecting a motion of the head of a user of the display device 400 or for detecting the head posture of the user of the display device 400. The sensor can transmit data about the motion of the user's head or data about the user's head posture to the processor of the display device 400 that can determine the direction of the field of view of the user based on the sensor data, which can be used to determine whether the user is looking at the first portion 402, the second portion 404, the third portion 406, or the fourth portion 408. The display device 400 can then determine one or more haptic effects or haptic tracks associated with the portion of the display device 400 that the user is looking at and the haptic effects or haptic tracks can be output by a haptic output device of the display device 400 (e.g., the haptic output device 159 of FIG. 1) or a haptic output device of a computing device associated with the user (e.g., the computing device 101a of FIG. 2).

For example, the sensor data indicates that the user is looking at the first portion 402 of the display device 400, which includes a scene involving combat between one or more virtual characters. The display device 400 can determine and output, via a haptic output device, a haptic track (e.g., a series of haptic effects, such as, for example, vibrations) associated with the first portion 402 of the display device 400 to allow the user of the display device 400 to experience haptic effects associated with the scene displayed on the first portion 402 of the display device 400. As another example, the sensor data indicates that the user is looking at the second portion 404 of the display device 400, which includes a scene involving a series of car collisions and the display device 400 can determine and output another haptic track associated with the series of car collisions to allow the user to perceive haptic effects associated with the series of car collisions.

In some embodiments, the display device 400 can determine that the user is simultaneously looking at more than one portion of the display device 400 and the display device 400 can determine a haptic track or haptic effect associated with each portion of the display device 400 or a characteristic of each haptic track or haptic effect based on this determination. As an example, the user is looking at the third portion 406 of the display device 400, which includes a scene involving a virtual character engaged in combat. The user is also simultaneously looking at the fourth portion 408 of the display device 400, which includes a scene involving a car revving its engine. The display device 400 can determine and output one or more haptic tracks based on the user simultaneously looking at both the third portion 406 and the fourth portion 408 of the display device 400.

For example, the display device 400 can determine a first haptic track associated with the third portion 406 (e.g., a series of vibrations corresponding to the virtual character being engaged in combat). The display device 400 can also determine a second haptic track associated with the fourth portion 408 (e.g., a series of vibrations corresponding to the car revving its engine). The display device 400 can output both of the first and second haptic tracks to the user via a haptic output device. In some embodiments, a single haptic track may comprise the first and second haptic tracks. In some examples, the display device 400 can adjust a characteristic of the first or second haptic track based on a field of view or direction of an eye gaze of the user. For example, the user's head posture may not change, but the field of view or direction of the eye gaze of the user may shift such that the user is more focused on the fourth portion 408 than the third portion 406. In such examples, the display device 400 can adjust a characteristic of the first or second haptic track based on the field of view or direction of the eye gaze of the user. As an example, the display device 400 can increase a magnitude of the second haptic track in response to determining that the field of view or direction of the eye gaze of the user is directed more toward the fourth portion 408 than the third portion 406. In this example, the display device 400 may also decrease a magnitude of the first haptic track in response to determining that the field of view or direction of the eye gaze of the user is directed more toward the fourth portion than the third portion 406. In this manner, the user of the display device 400 may experience haptic effects associated with both the third portion 406 and fourth portion 408 of the display device 400 that the user is looking at.

In some embodiments, the display device 400 can be configured to output a single haptic track associated with the portions 402, 404, 406, 408. The haptic track can include a haptic effect (e.g., a vibration) or a series of haptic effects that correspond to content (e.g., a video) being displayed on the display device 400 (e.g., via portions 402, 404, 406, 408). As an example, the display device 400 is displaying a video that includes a series of car collisions and various explosions. The haptic track can include one or more vibrations that correspond to the car collisions or explosions.

In some examples, the sensor of the display device 400 can detect a motion of the user's head or detect the user's head posture and the display device 400 can determine a characteristic of the haptic track (e.g., determine a magnitude of one or more vibrations in the haptic track) based at least in part on the motion of the user's head or the user's head posture. As an example, the user's head posture may be positioned such that the user is looking at or toward the second portion 404. The user's head posture may subsequently shift such that the user is looking at or toward the third portion 406. In such examples, the display device 400 can adjust a characteristic of the haptic track based on the change in the user's head posture. For example, the display device 400 can decrease a magnitude of a haptic effect in the haptic track that is associated with the second portion 404 (e.g., a vibration associated with an explosion displayed on the second portion 404) and increase a magnitude of another haptic effect in the haptic track that is associated with the third portion 406 (e.g., a vibration associated with a virtual character engaged in combat on the third portion 406) as the user's head posture changes from being directed toward the second portion 404 to being directed toward the third portion 406. In this manner, the display device 400 can output a single haptic track and modify haptic effects included in the haptic track based on the motion of the user's head or the user's head posture such that the user may perceive the haptic track as being multiple haptic tracks. While in this example, the display device 400 may determine a characteristic (e.g., magnitude) of a haptic track based at least in part on the motion of the user's head or the user's head posture, the present disclosure is not limited to such configurations. Rather, in other examples, the display device may determine a characteristic of a haptic track based at least in part on a direction of a field of view or eye gaze of the user in substantially the same manner as described above. In some examples, modifying a haptic effect included in a single haptic track as described above can simulate a spatial multi-haptic track using a single haptic track.

In some examples, the display device 400 can include or be communicatively coupled to one or more audio devices or systems (not shown), which can be configured to generate electronic signals that will drive a speaker to output corresponding sounds. The audio device or system can be configured to output audio or sounds based on the motion of the user's head or the user's head posture, the direction of a field of view, or the direction of the eye gaze of the user. As an example, the user's head posture may be positioned such that the user is looking at or toward the second portion 404, which includes a scene depicting a car revving its engine. The display device 400 may transmit one or more signals to the audio device to cause the audio device to output a sound corresponding to the car revving its engine in response to determining that the user is looking at or toward the second portion 404. The display device 400 may also cause the audio device to amplify an intensity or volume of the sound based on the user looking at or toward the second portion 404. In some such examples, the display device 400 may also determine a characteristic of a haptic effect or haptic track associated with the scene depicted on the second portion 404 in response to determining that the user is looking at or toward the second portion 404. For example, the display device 400 can increase a magnitude of a vibration that corresponds to the car revving its engine in response to determining that the user is looking at or toward the second portion 404. In this manner, the display device 400 can provide a spatial multi-haptic track using a single haptic track as described above, and the haptic track or haptic effects in the haptic track may correspond to sounds provided by an audio device or system (e.g., a spatial audio system).

In some examples, the display device 400 can be configured to display content on one or more portions of the display device 400. As an example, the display device 400 may only display content on the first portion 402 and may not display content on the second portion 404, the third portion 406, or the fourth portion 408. For example, the display device 400 can be a virtual reality headset and the display device 400 may only display a scene on the first portion 402. In such examples, the display device 400 can determine that a user is looking at the scene displayed on the first portion 402 of the display device 400 and the display device 400 can output a haptic track associated with the first portion 402 to the user or output a haptic track associated with the scene displayed on the first portion 402 to the user. The user may subsequently look at, or in the direction of, another portion of the display device 400. For example, the user's head posture may be adjusted such that the user is looking at the second portion 404 and is no longer looking at the first portion 402. In such examples, the display device 400 can determine that the user is looking at the second portion 404 and can output another haptic track associated with the second portion 404 or another haptic track associated with content displayed on the second portion 404 to the user in response to determining that the user is looking at the second portion and no longer looking at the first portion 402. In some examples, the display device 400 may also stop displaying content on the first portion 402 in response to determining that the user is looking at the second portion 404 and no longer looking at the first portion 402. Thus, in some examples, the display device 400 may provide content to the user via a particular portion of the display device 400, which can cause the user to look at or toward the particular portion and perceive haptic effects associated with that particular portion of the display device 400. In another example, the display device 400 may provide content to the user via a particular portion of the display device 400 that the user is looking at or toward and the user may perceive haptic effects associated with the particular portion of the display device 400 that the user is looking at or toward.

While in the example described above, the display device 400 may display content on a particular portion of the display device 400 based on the user's head posture being directed at the particular portion, the present disclosure is not limited to such configurations. Rather, in other examples, the display device may display content via one or more portions of the display device 400 based on a field of view or direction of an eye gaze of a user of the display device 400 (e.g., in substantially the same manner as described above). Further, while in the example described above, the display device 400 may only display content on one portion of the display device 400, the present disclosure is not limited to such configurations. Rather, in other examples, the display device 400 may display content via one or more portions of the display device 400 individually or simultaneously.

Figure 5:
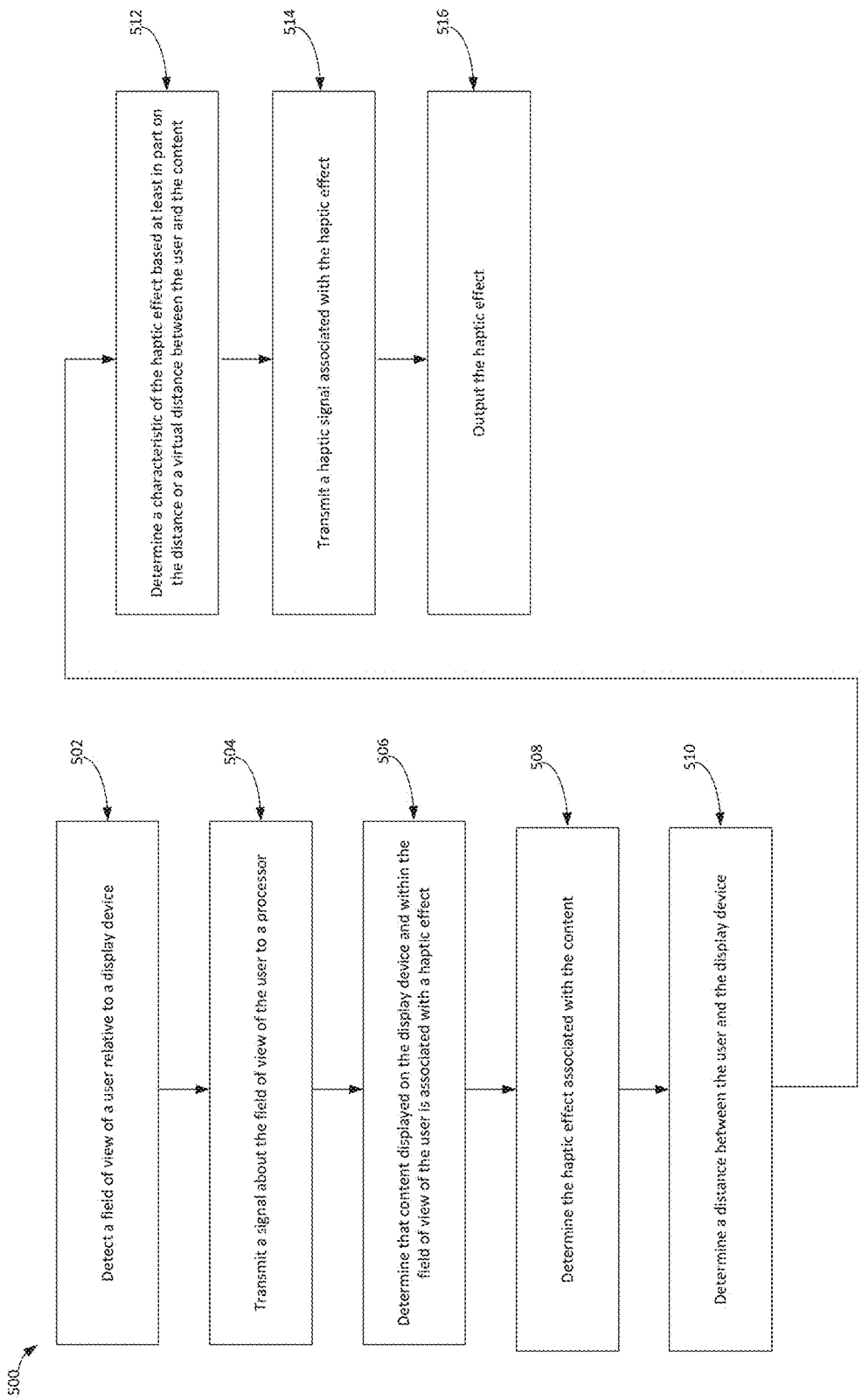
FIG. 5 is a flow chart of steps for performing a method for providing haptic feedback using a field of view according to one embodiment.

Illustrative Methods for Haptic Feedback for Providing Haptic Feedback Using a Field of View FIG. 5 is a flow chart of steps for performing a method 500 for providing haptic feedback using a field of view according to one embodiment.

In some embodiments, the steps in FIG. 5 may be implemented in program code that is executable by a processor, for example, the processor in a general purpose computer, a mobile device, or a server. In some embodiments, these steps may be implemented by a group of processors. In some embodiments, one or more steps shown in FIG. 5 may be omitted or performed in a different order. Similarly, in some embodiments, additional steps not shown in FIG. 5 may also be performed. The steps below are described with reference to components described above with regard to the systems shown in FIGS. 1 and 2.

The method 500 begins at step 502 when the sensor 203 of the display device 136 detects a field of view 210 of a user 202a of a computing device 101 relative to a display device 136. In some embodiments, the sensor 203 comprises a camera, a sensor for detecting a head motion or head posture of the user 202a, or other suitable device, that can detect the field of view 210 or a direction of an eye gaze 212a-b of the user 202a or provide data for determining the field of view 210 or the direction of the eye gaze 212a-b of the user 202a.

The method 500 continues at step 504 when a signal about the field of view 210 or the direction of an eye gaze 212a-b of the user 202a is transmitted to a processor 138 of the display device 136 or a processor 102 of the computing device 101. In some embodiments, the sensor 203 transmits the signal about the field of view 210 or the direction of an eye gaze 212a-b of the user 202a to the processor 138 or 102.

The method 500 continues at step 506 when the processor 102 or 138 determines that content displayed on the display device 136 and within the field of view 210 of the user 202a is associated with a haptic effect. In some embodiments, the haptic effect determination module 126 of the computing device 101 causes the processor 102 to determine that content displayed on the display device 136 and within the field of view 210 of the user 202a is associated with a haptic effect. In other embodiments, the haptic effect determination module 162 of the display device 136 causes the processor 138 to determine that content displayed on the display device 136 and within the field of view 210 of the user 202a is associated with a haptic effect.

For example, the processor 102 or 138 can determine that the user 202a is looking at, or in the direction of, content (e.g., texts, images, sounds, videos, characters, virtual objects, virtual animations, etc.) provided via the display device 136 based on the field of view 210 or the direction of an eye gaze 212a-b of the user 202a. As an example, the sensor 203 can include a camera for monitoring movements of an eye of the user 202a or muscles near the eye of the user 202a and the processor 102 or 138 can determine the field of view 210 or the direction of the eye gaze 212a-b based on the monitored movements. As another example, the sensor 203 monitors or measures electrical activity of the muscles moving the eye of the user 202a and the processor 102 or 138 can determine the field of view 210 or the direction of the eye gaze 212a-b based on the electrical activity of the muscles. The processor 102 or 138 can determine that the user 202a is looking at, or in the direction of, the content on the display device 136 based on the field of view 210 or the direction of the eye gaze 212a-b of the user 202a. Based on this determination, the processor 102 or 138 can determine that content displayed on the display device 136 and within the field of view 210 of the user 202a is associated with a haptic effect.

As an example, the processor 138 can determine that virtual objects 204, 206 displayed on display device 136 are within the field of view 210 of the user 202a. The processor 138 can access one or more lookup tables or databases that include data corresponding to various haptic effects associated with various content that can be displayed by the display device 136. The processor 138 can access the one or more lookup tables or databases and determine that virtual objects 204, 206 within the field of view 210 of the user 202a are associated with one or more haptic effects.

The method 500 continues at step 508 when the processor 102 or 138 determines the haptic effect associated with the content. In some embodiments, the haptic effect determination module 126 of the computing device 101 causes the processor 102 to determine the haptic effect associated with the content. In other embodiments, the haptic effect determination module 162 of the display device 136 causes the processor 138 to determine the haptic effect associated with the content.

For example, the processor 138 can determine that content (e.g., virtual object 204) displayed on the display device 136 is within the field of view 210 of the user 202a and is associated with a haptic effect (e.g., in step 506). Based on this determination, the processor 138 can determine or select the haptic effect associated with the content (e.g., the haptic effect associated with virtual object 204). As an example, the processor 138 can access the one or more lookup tables or databases and select the haptic effect associated with the content.

In some embodiments, the haptic effect can include one or more haptic effects that can allow the user 202a to perceive or experience haptic effects that are relevant to the content that the user 202a is looking at. As an example, the user 202a may be looking at the virtual object 204, which can be a virtual character engaged in combat. The haptic effect can include one or more vibrations to allow the user 202a to perceive the combat.

In some embodiments, in step 508, the processor 102 or 138 can determine one or more haptic effects based on the user 202a looking at, or in the direction of, various content displayed on display device 136. As an example, the processor 138 can determine that the direction of the field of view 210 or the direction of the eye gaze 212a of the user 202a corresponds with a position or location of virtual object 204 displayed by the display device 136. The processor 138 can also determine that the direction of the field of view 210 or the direction of the eye gaze 212b of the user 202a corresponds with a position or location of another virtual object 206 displayed by the display device 136. Based on this determination, the processor 138 can access the one or more lookup tables or databases and determine a first haptic effect associated with the virtual object 204 and a second haptic effect associated with the virtual object 206.

The method 500 continues at step 510 when the processor 102 or 138 determines a distance between the user 202a and the display device 136. In some embodiments, the sensor 203 can be a Bluetooth device or other network device configured to detect a location of another Bluetooth device by analyzing signal strength between the sensor 203 and the Bluetooth device. In some embodiments, the sensor 203 may detect a distance between the sensor 203 or the display device 136 and a computing device 101 or the user 202a of the computing device 101 (e.g., based on the strength of the Bluetooth signal between the sensor 203 and the computing device 101). The sensor 203 can transmit sensor signals to the processor 102 or 138, which can determine the distance between the sensor 203 or the display device 136 and the computing device 101 or the user 202a of the computing device 101 based on the sensor signals. In some embodiments, the sensor 203 may detect a location of the computing device 101 or a distance between the sensor 203 or the display device 136 and the computing device 101 or the user 202a of the computing device 101 via any suitable method or technique.

The method 500 continues at step 512 when the processor 102 or 138 determines a characteristic (e.g., a magnitude, duration, location, type, frequency, etc.) of the haptic effect based at least in part on the distance between the sensor 203 or the display device 136 and the computing device 101 or the user 202a of the computing device 101. In some embodiments, the haptic effect determination module 126 of the computing device 101 causes the processor 102 to determine the characteristic of the haptic effect based at least in part on the distance between the sensor 203 or the display device 136 and the computing device 101 or the user 202a of the computing device 101. In other embodiments, the haptic effect determination module 162 of the display device 136 causes the processor 138 to determine the characteristic of the haptic effect based at least in part on the distance between the sensor 203 or the display device 136 and the computing device 101 or the user 202a of the computing device 101.

For example, the processor 138 can determine that the user 202a is near display device 136 or virtual object 204 displayed on display device 136. The processor 138 can determine a magnitude of the haptic effect associated with the virtual object 204 based on the user 202a being near the display device 136 or virtual object 204. As an example, the haptic effect associated with the virtual object 204 can be a strong or long haptic effect if the user 202a is near the display device 136. As another example, the processor 138 can determine that the user is far from the display device 136 or virtual object 204 displayed on the display device 136 and determine a weak or short haptic effect associated with the virtual object 204 based on this determination.

The method 500 continues at step 514 when the processor 102 or 138 transmits a haptic signal associated with the haptic effect to a haptic output device 118. In some embodiments, the haptic effect generation module 128 causes the processor 102 to generate and transmit the haptic signal to the haptic output device 118. In another embodiment, the haptic effect generation module 164 causes the processor 138 to generate and transmit the haptic signal to the haptic output device 118.

The method 500 continues at step 516 when haptic output device 118 outputs the haptic effect based on the user 202a looking at, toward, or in the direction of, content (e.g., virtual objects 204, 206) associated with the haptic effect and displayed on display device 136. In some embodiments, the haptic effect may allow the user 202a to perceive or experience haptic effects relevant to the content (e.g., virtual objects 204, 206) that the user is looking at.

Figure 6:
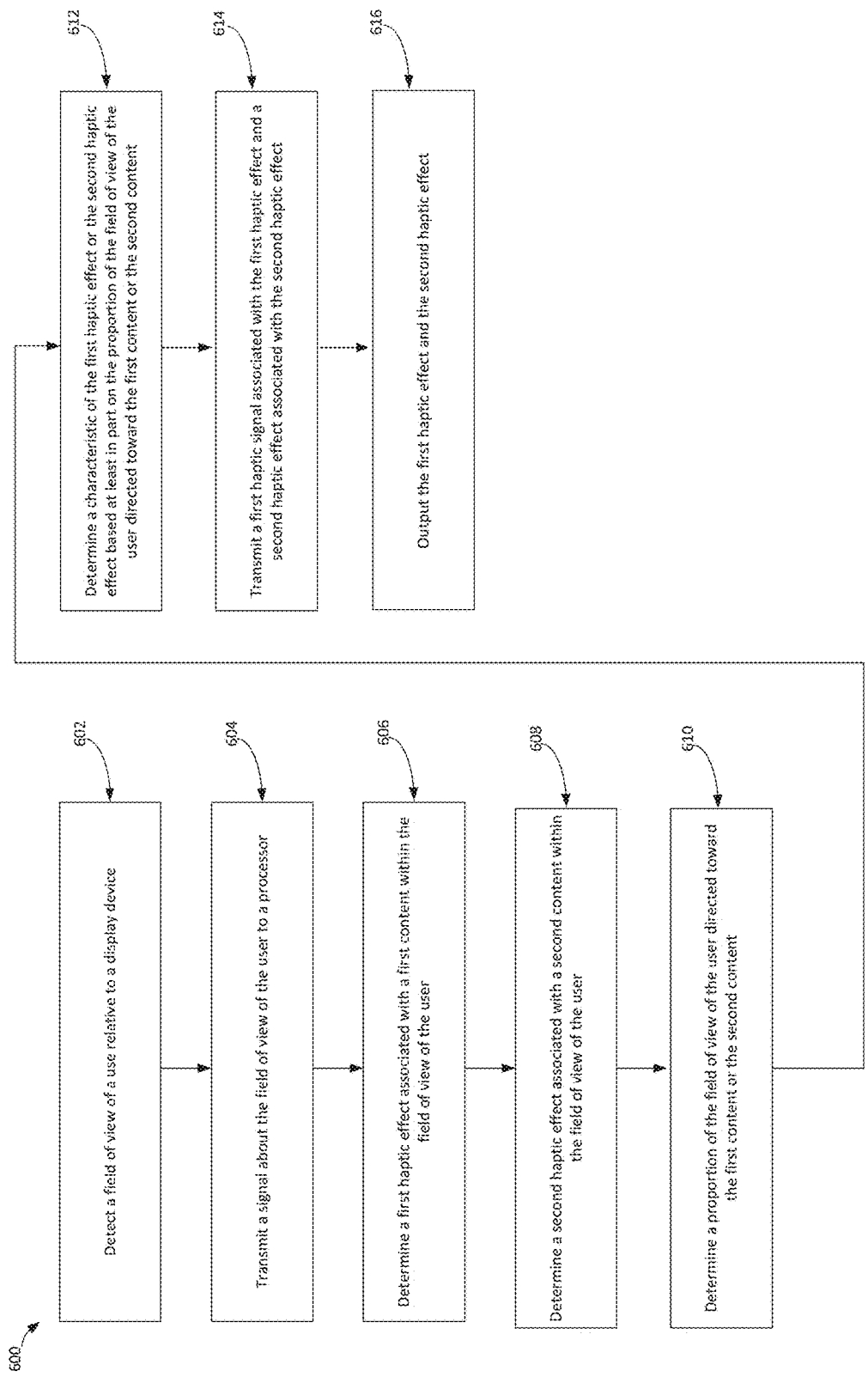
FIG. 6 is a flow chart of steps for performing another method for providing haptic feedback using a field of view according to one embodiment.

FIG. 6 is a flow chart of steps for performing another method 600 for providing haptic feedback using a field of view according to one embodiment. In some embodiments, the steps in FIG. 6 may be implemented in program code that is executable by a processor, for example, the processor in a general purpose computer, a mobile device, or a server. In some embodiments, these steps may be implemented by a group of processors. In some embodiments, one or more steps shown in FIG. 6 may be omitted or performed in a different order. Similarly, in some embodiments, additional steps not shown in FIG. 6 may also be performed. The steps described below are described with reference to components described above with regard to the systems shown in FIGS. 1 and 2.

The method 600 begins at step 602 when the sensor 203 of the display device 136 detects a field of view 210 of a user 202a of a computing device 101 relative to a display device 136. In some embodiments, the sensor 203 comprises a camera, a sensor for detecting a head motion or head posture of the user 202a, or other suitable device, that can detect the field of view 210 or a direction of an eye gaze 212a-b of the user 202a relative to the display device 136 or provide data for determining the field of view 210 or a direction of an eye gaze 212a-b of the user 202a relative to the display device 136.

The method 600 continues at step 604 when a signal about the field of view 210 or the direction of an eye gaze 212a-b of the user 202a is transmitted to a processor 138 of the display device 136 or a processor 102 of the computing device 101. In some embodiments, the signal about the field of view 210 or the direction of an eye gaze 212a-b of the user 202a can be transmitted to the processor 138 or the processor 102 in substantially the same manner as described above with respect to step 504 of FIG. 5.

The method 600 continues at step 606 when the processor 102 or 138 determines a first haptic effect associated with a first content within the field of view 210 of the user 202a. In some embodiments, the haptic effect determination module 126 of the computing device 101 causes the processor 102 to determine the first haptic effect associated with the first content within the field of view 210 of the user 202*a*. In other embodiments, the haptic effect determination module 162 of the display device 136 causes the processor 138 to determine the first haptic effect associated with the first content within the field of view 210 of the user 202*a*.

For example, the processor 138 can receive sensor signals from the sensor 203 (e.g., in step 604) and determine the field of view 210 or the direction of an eye gaze 212*a-b* of the user 202*a* based on the sensor signals. The processor 138 can determine that the user 202*a* is looking at, or in the direction of, the virtual object 204 based on this determination. The processor 138 can access one or more lookup tables or databases that include data corresponding to various haptic effects associated with various content that can be displayed by the display device 136. The processor 138 can access the one or more lookup tables or databases and determine the first haptic effect associated with the virtual object 204 within the field of view 210 of the user 202*a*.

The method 600 continues at step 608 when the processor 102 or 138 determines a second haptic effect associated with a second content within the field of view 210 of the user 202*a*. In some embodiments, the haptic effect determination module 126 of the computing device 101 causes the processor 102 to determine the second haptic effect associated with the second content within the field of view 210 of the user 202*a*. In other embodiments, the haptic effect determination module 162 of the display device 136 causes the processor 138 to determine the second haptic effect associated with the second content within the field of view 210 of the user 202*a*.

For example, the processor 138 can receive sensor signals from the sensor 203 (e.g., in step 604) and determine the field of view 210 or the direction of an eye gaze 212*a-b* of the user 202*a* based on the sensor signals. Based on this determination, the processor 138 can determine that the user 202*a* is looking at, or in the direction of, the virtual object 206. The processor 138 can access one or more lookup tables or databases that include data corresponding to various haptic effects associated with various content that can be displayed by the display device 136. The processor 138 can access the one or more lookup tables or databases and determine the second haptic effect associated with the virtual object 206 within the field of view 210 of the user 202*a*.

The method 600 continues at step 610 when the processor 102 or 138 determines a proportion of the field of view 210 of the user 202*a* directed toward the first content or the second content. In some embodiments, the haptic effect determination module 126 of the computing device 101 causes the processor 102 to determine the proportion of the field of view 210 of the user 202*a* directed toward the first content or the second content. In other embodiments, the haptic effect determination module 162 of the display device 136 causes the processor 138 to determine the proportion of the field of view 210 of the user 202*a* directed toward the first content or the second content.

As an example, the processor 138 can receive sensor signals from the sensor 203 (e.g., in step 604) and determine that half of the user's field of view 210 is directed toward the virtual object 204 or that half of the user's field of view 210 is directed toward the virtual object 206 based on the sensor signals.

The method 600 continues at step 612 when the processor 102 or 138 determines a characteristic of the first haptic effect or the second haptic effect based at least in part on the proportion of the field of view 210 of the user 202*a* directed toward the first content or the second content. In some embodiments, the haptic effect determination module 126 of the computing device 101 causes the processor 102 to determine the characteristic of the first haptic effect or the second haptic effect based at least in part on the proportion of the field of view 210 of the user 202*a* directed toward the first content or the second content. In other embodiments, the haptic effect determination module 162 of the display device 136 causes the processor 138 to determine the characteristic of the first haptic effect or the second haptic effect based at least in part on the proportion of the field of view 210 of the user 202*a* directed toward the first content or the second content.

As an example, the processor 138 can determine that half of the user's field of view 210 is directed toward the virtual object 204 and that half of the user's field of view 210 is directed toward the virtual object 206 (e.g., in step 610). Based on this determination, the processor 138 can adjust a first magnitude of the first haptic effect associated with the virtual object 204 and adjust a second magnitude of the second haptic effect associated with the virtual object 206 to half the second magnitude. Thus, in some examples, the characteristic of a haptic effect perceived by the user 202*a* may be proportional to, or vary depending on, the user's eye gaze, line-of-sight, or a portion of the user's field of view directed toward particular content.

The method 600 continues at step 614 when the processor 102 or 138 transmits a first haptic signal associated with the first haptic effect and a second haptic signal associated with the second haptic effect to the haptic output device 118. In some embodiments, the haptic effect generation module 128 causes the processor 102 to generate and transmit the first and second haptic signals to the haptic output device 118. In another embodiment, the haptic effect generation module 164 causes the processor 138 to generate and transmit the first and second haptic signals to the haptic output device 118.

The method 600 continues at step 616 when haptic output device 118 outputs the first haptic effect based on the user 202*a* looking at, toward, or in the direction of, the first content (e.g., virtual object 204) associated with the first haptic effect and outputs the second haptic effect based on the user 202*a* looking at, toward, or in the direction of, the second content (e.g., the virtual object 206) associated with the second haptic effect. In some embodiments, the first or second haptic effect comprises a vibration, a surface deformation, a squeeze, a poke, and/or a puff of a solid, liquid, gas, or plasma.

Figure 7:
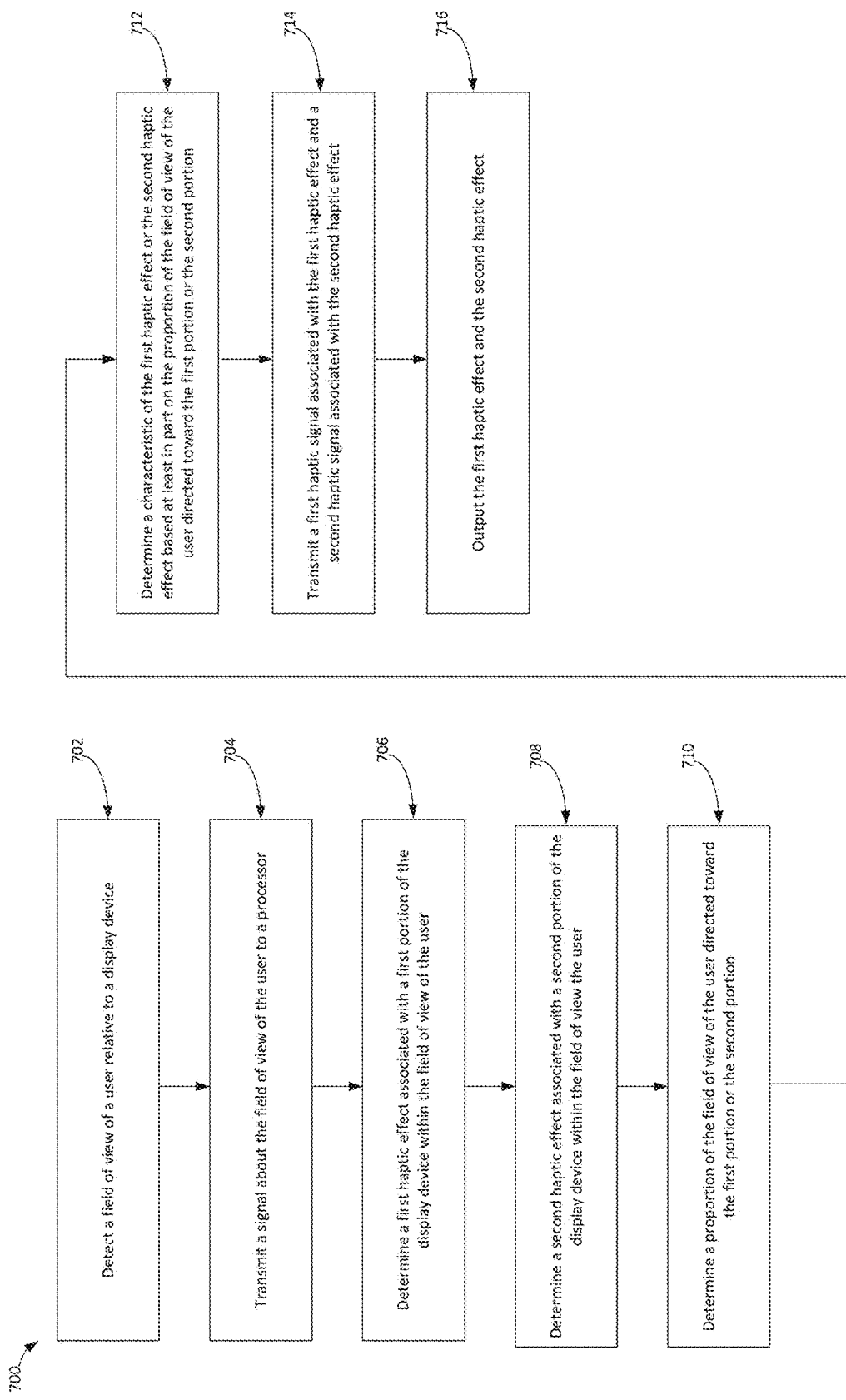
FIG. 7 is a flow chart of steps for performing another method for providing haptic feedback using a field of view according to one embodiment.

FIG. 7 is a flow chart of steps for performing another method 600 for providing haptic feedback using a field of view according to one embodiment. In some embodiments, the steps in FIG. 7 may be implemented in program code that is executable by a processor, for example, the processor in a general purpose computer, a mobile device, or a server. In some embodiments, these steps may be implemented by a group of processors. In some embodiments, one or more steps shown in FIG. 7 may be omitted or performed in a different order. Similarly, in some embodiments, additional steps not shown in FIG. 7 may also be performed. The steps described below are described with reference to components described above with regard to the systems shown in FIGS. 1 and 2.

The method 700 begins at step 702 when the sensor 203 of the display device 136 detects a field of view 210 of a user 202*a* of a computing device 101 relative to a display device 136. In some embodiments, the sensor 203 comprises a camera, a sensor for detecting a head motion or head posture of the user 202a, or other suitable device, that can detect the field of view 210 or a direction of an eye gaze 212a-b of the user 202a relative to the display device 136 or provide data for determining the field of view 210 or a direction of an eye gaze 212a-b of the user 202a relative to the display device 136.

The method 700 continues at step 704 when a signal about the field of view 210 or the direction of an eye gaze 212a-b of the user 202a is transmitted to a processor 138 of the display device 136 or a processor 102 of the computing device 101. In some embodiments, the signal about the field of view 210 or the direction of an eye gaze 212a-b of the user 202a can be transmitted to the processor 138 or the processor 102 in substantially the same manner as described above with regard to step 504 of FIG. 5.

The method 700 continues at step 706 when the processor 102 or 138 determines a first haptic effect associated with a first portion of the display device 136 within the field of view 210 of the user 202a. In some embodiments, the haptic effect determination module 126 of the computing device 101 causes the processor 102 to determine the first haptic effect associated with the first portion of the display device 136 within the field of view 210 of the user 202a. In other embodiments, the haptic effect determination module 162 of the display device 136 causes the processor 138 to determine the first haptic effect associated with the first portion of the display device 136 within the field of view 210 of the user 202a.

For example, the processor 138 can receive sensor signals from the sensor 203 (e.g., in step 704) and determine the field of view 210 or the direction of an eye gaze 212a-b of the user 202a based on the sensor signals. The processor 138 can determine that the user 202a is looking at, or in the direction of, a left portion of the display device 136 based on this determination. The processor 138 can access one or more lookup tables or databases that include data corresponding to various haptic effects associated with various portions of, or locations on, the display device 136. The processor 138 can access the one or more lookup tables or databases and determine the haptic effect associated with the left portion of the display device 136 that the user 202a is looking at or toward. In some embodiments, the first haptic effect associated with the first portion of the display device 136 may allow the user 202a to perceive one or more haptic effects relevant to the first portion of the display device 136. For example, the left portion of the display device 136 may include a scene depicting a series of collisions and the haptic effect associated with the left portion may include one or more vibrations to allow the user 202a to perceive or experience the series of collisions.

The method 700 continues at step 708 when the processor 102 or 138 determines a second haptic effect associated with a second portion of the display device 136 within the field of view 210 of the user 202a. In some embodiments, the haptic effect determination module 126 of the computing device 101 causes the processor 102 to determine the second haptic effect associated with the second portion of the display device 136 within the field of view 210 of the user 202a. In other embodiments, the haptic effect determination module 162 of the display device 136 causes the processor 138 to determine the second haptic effect associated with the second portion of the display device 136 within the field of view 210 of the user 202a.

For example, the processor 138 can receive sensor signals from the sensor 203 (e.g., in step 704) and determine the field of view 210 or the direction of an eye gaze 212a-b of the user 202a based on the sensor signals. The processor 138 can determine that the user 202a is looking at, or in the direction of, a top portion of the display device 136 based on this determination. For instance, the user 202a may be simultaneously looking at the left portion (e.g., in step 706) and the top portion of the display device 136. The processor 138 can access one or more lookup tables or databases that include data corresponding to various haptic effects associated with various portions of, or locations on, the display device 136. The processor 138 can access the one or more lookup tables or databases and determine the haptic effect associated with the top portion of the display device 136. In some embodiments, the second haptic effect associated with the second portion of the display device 136 may allow the user 202a to perceive one or more haptic effects relevant to the second portion of the display device 136. For example, the top portion of the display device 136 may include a scene depicting a car revving its engine and the haptic effect associated with the top portion may include one or more vibrations to allow the user 202a to perceive or experience the revving of the engine.

The method 700 continues at step 710 when the processor 102 or 138 determines a proportion of the field of view 210 of the user 202a directed toward the first portion of the display device 136 or the second portion of the display device 136. In some embodiments, the haptic effect determination module 126 of the computing device 101 causes the processor 102 to determine the proportion of the field of view 210 of the user 202a directed toward the first or second portion of the display device 136. In other embodiments, the haptic effect determination module 162 of the display device 136 causes the processor 138 to determine the proportion of the field of view 210 of the user 202a directed toward the first or second portion of the display device 136.

As an example, the processor 138 can receive sensor signals from the sensor 203 (e.g., in step 704) and determine that one-fourth of the user's field of view 210 is directed toward the left portion of the display device 136 (e.g., the first portion) and that three-fourths of the user's field of view 210 is directed toward the top portion of the display device 136 (e.g., the second portion) based on the sensor signals.

The method 700 continues at step 712 when the processor 102 or 138 determines a characteristic of the first haptic effect or the second haptic effect based at least in part on the proportion of the field of view 210 of the user 202a directed toward the first portion or the second portion of the display device 136. In some embodiments, the haptic effect determination module 126 of the computing device 101 causes the processor 102 to determine the characteristic of the first haptic effect or the second haptic effect based at least in part on the proportion of the field of view 210 of the user 202a directed toward the first portion or the second portion of the display device 136. In other embodiments, the haptic effect determination module 162 of the display device 136 causes the processor 138 to determine the characteristic of the first haptic effect or the second haptic effect based at least in part on the proportion of the field of view 210 of the user 202a directed toward the first portion or the second portion of the display device 136.

As an example, the processor 138 can determine that one-fourth of the user's field of view 210 is directed toward the left portion of the display device 136 and that three-fourths of the user's field of view 210 is directed toward the top portion of the display device 136 (e.g., in step 710). Based on this determination, the processor 138 can adjust a first magnitude of the first haptic effect associated with the left portion of the display device 136 to one-fourth the first magnitude and adjust a second magnitude of the second haptic effect associated with the top portion of the display device 136 to three-fourths the second magnitude. Thus, in some examples, the characteristic of a haptic effect perceived by the user 202*a* may be proportional to, or vary depending on, the user's eye gaze 212*a-b*, line-of-sight, or a portion of the user's field of view 210 directed toward a particular portion of the display device 136 that is associated with a haptic effect.

The method 700 continues at step 714 when the processor 102 or 138 transmits a first haptic signal associated with the first haptic effect and a second haptic signal associated with the second haptic effect to the haptic output device 118. In some embodiments, the haptic effect generation module 128 causes the processor 102 to generate and transmit the first and second haptic signals to the haptic output device 118. In another embodiment, the haptic effect generation module 164 causes the processor 138 to generate and transmit the first and second haptic signals to the haptic output device 118.

The method 700 continues at step 716 when the haptic output device 118 outputs the first haptic effect based on the user 202*a* looking at, toward, or in the direction of, the first portion of the display device 136 (e.g., the left of display device 136) associated with the first haptic effect and outputs the second haptic effect based on the user 202*a* looking at, toward, or in the direction of the second portion of the display device 136 (e.g., the top portion of the display device 136) associated with the second haptic effect. In some embodiments, the first or second haptic effect comprises a vibration, a surface deformation, a squeeze, a poke, and/or a puff of a solid, liquid, gas, or plasma.

In this manner, the systems for haptic feedback based on a field of view described herein can provide a user with a more immersive experience as the user views content on a display device by providing one or more haptic effects relevant to specific content that the user is looking at or relevant to a particular portion of a display device that the user is looking at. Thus, for instance, the user can perceive haptic effects relative to the content that the user is looking at so that the user is not overwhelmed with haptic effects associated with content that the user is not looking at or toward.

GENERAL CONSIDERATIONS

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A system comprising:
   a computing device communicatively coupled to a display device, the display device configured to display a first content and a second content;
   a sensor communicatively coupled to the computing device and configured to detect a field of view of a user of the computing device relative to the display device and transmit a signal associated with the field of view;
   a processor communicatively coupled to the sensor for receiving the signal, the processor configured to:
      determine a direction of the field of view of the user based at least in part on the signal;
      determine that the first content and the second content displayed via the display device and within the direction of the field of view of the user are associated with a haptic track comprising at least one haptic effect;
      determine the haptic track associated with the first content and the second content;
      determine a change of an eye-gaze of the user based at least in part on the signal;
      determine a characteristic of the haptic track based at least in part on the change of the eye-gaze of the user;
      transmit a haptic signal associated with the haptic track; and
   a haptic output device configured to receive the haptic signal and output the haptic track.

2. The system of claim 1, wherein the sensor is further configured to detect a distance between the user and the display device and transmit a distance sensor signal associated with the distance to the processor and the processor is further configured to determine a characteristic of the haptic track based at least in part on the distance.

3. The system of claim 2, wherein the characteristic of the haptic track includes a magnitude, duration, location, type, or frequency of the haptic effect.

4. The system of claim 1, wherein the processor is further configured to:
   determine a first haptic effect associated with the first content within the field of view of the user;
   determine a second haptic effect associated with the second content within the field of view of the user;
   transmit a first haptic signal associated with the first haptic effect; and
   transmit a second haptic signal associated with the second haptic effect, wherein the haptic output device is configured to receive the first haptic signal and the second haptic signal and output the first and second haptic effects.

5. The system of claim 4, wherein the processor is further configured to:
   determine a proportion of the field of view of the user directed toward the first content or the second content; and
   determine a characteristic of the first haptic effect or the second haptic effect based at least in part on the proportion of the field of view of the user directed toward the first content or the second content.

6. The system of claim 4, wherein the processor is further configured to:
   determine a first direction of an eye-gaze of the user directed toward the first content;
   determine a second direction of an eye-gaze of the user directed toward the second content;
   determine the change of the eye-gaze of the user based on the first direction and the second direction; and
   determine a characteristic of the first haptic effect or the second haptic effect based at least in part on the change of the eye-gaze of the user.

7. The system of claim 1, wherein the processor is further configured to:
   determine a first haptic effect associated with a first portion of the display device within the field of view of the user;
   determine a second haptic effect associated with a second portion of the display device within the field of view of the user;
   transmit a first haptic signal associated with the first haptic effect; and
   transmit a second haptic signal associated with the second haptic effect, wherein the haptic output device is configured to receive the first haptic signal and the second haptic signal and output the first and second haptic effects.

8. The system of claim 7, wherein the processor is further configured to:
   determine a proportion of the field of view of the user directed toward the first portion of the display device or the second portion of the display device; and
   determine a characteristic of the first haptic effect or the second haptic effect based at least in part on the proportion of the field of view of the user directed toward the first portion of the display device or the second portion of the display device.

9. The system of claim 1, wherein the sensor comprises a camera configured to capture an image associated with an eye of the user and the processor is configured to determine the direction of the field of view of the user based on the image.

10. The system of claim 1, wherein the sensor is configured to monitor a movement of a muscle in an eye of the user and the processor is configured to determine the direction of the field of view of the user based on the monitored movement.

11. The system of claim 1, wherein the computing device comprises a virtual reality headset and the processor is further configured to:

generate a virtual reality environment; and
transmit data that includes the virtual reality environment and a plurality of content to the display device and the display device is configured to display the plurality of content, the plurality of content including a plurality of virtual objects.

12. The system of claim 1, wherein the processor is further configured to determine a characteristic of the haptic track based at least in part on a virtual distance between the user and the first content or the second content.

13. A method comprising:
detecting, by a sensor, a field of view of a user of a computing device relative to a display device communicatively coupled to the computing device, the display device configured to display a first content and a second content;
transmitting, by the sensor, a sensor signal associated with the field of view to a processor;
determining, by the processor, a direction of the field of view based at least in part on the sensor signal;
determining, by the processor, that the first content and the second content displayed via the display device are within the field of view of the user based on the direction of the field of view;
determining, by the processor, a haptic track associated with the first content and the second content;
determining a change of an eye-gaze of the user based at least in part on the sensor signal;
determining a characteristic of the haptic track based at least in part on the change of the eye-gaze of the user;
transmitting, by the processor, a haptic signal associated with the haptic track to a haptic output device; and
outputting, by the haptic output device, the haptic track.

14. The method of claim 13, further comprising:
detecting, by the sensor, a distance between the user and the display device;
transmitting, by the sensor, a distance signal associated with the distance to the processor; and
determining, by the processor, a characteristic of the haptic track based at least in part on the distance.

15. The method of claim 14, wherein the characteristic of the haptic track includes a magnitude, duration, location, type, or frequency of the haptic effect.

16. The method of claim 13, further comprising:
determining, by the processor, a first haptic effect associated with the first content within the field of view of the user;
determining, by the processor, a second haptic effect associated with the second content within the field of view of the user;
transmitting, by the processor, a first haptic signal associated with the first haptic effect;
transmitting, by the processor, a second haptic signal associated with the second haptic effect; and
outputting, by the haptic output device, the first haptic effect and the second haptic effect, wherein the first haptic effect is different from the second haptic effect.

17. The method of claim 16, further comprising:
determining, by the processor, a proportion of the field of view of the user directed toward the first content or the second content; and
determining, by the processor, a characteristic of the first haptic effect or the second haptic effect based at least in part on the proportion of the field of view of the user directed toward the first content or the second content, the characteristic including a magnitude, duration, location, type, or frequency of the first haptic effect or the second haptic effect.

18. The method of claim 16, further comprising:
determining, by the processor, a first direction of an eye-gaze of the user directed toward the first content;
determining, by the processor, a second direction of an eye-gaze of the user directed toward the second content;
determining, by the processor, the change of the eye-gaze of the user based on the first direction and the second direction; and
determining, by the processor, a characteristic of the first haptic effect or the second haptic effect based at least in part on the change of the eye-gaze of the user the characteristic including a magnitude, duration, location, type, or frequency of the first haptic effect or the second haptic effect.

19. The method of claim 13, further comprising:
determining, by the processor, a first haptic effect associated with a first portion of the display device within the field of view of the user;
determining, by the processor, a second haptic effect associated with a second portion of the display device within the field of view of the user;
transmitting, by the processor, a first haptic signal associated with the first haptic effect;
transmitting, by the processor, a second haptic signal associated with the second haptic effect; and
outputting, by the haptic output device, the first haptic effect and the second haptic effect, wherein the first haptic effect is different from the second haptic effect.

20. The method of claim 19, further comprising:
determining, by the processor, a proportion of the field of view of the user directed toward the first portion of the display device or the second portion of the display device; and
determining, by the processor, a characteristic of the first haptic effect or the second haptic effect based at least in part on the proportion of the field of view of the user directed toward the first portion of the display device or the second portion of the display device, the characteristic including a magnitude, duration, location, type, or frequency of the first haptic effect or the second haptic effect.

21. The method of claim 13, wherein the sensor is configured to monitor a movement of an eye of the user and the processor is configured to determine the direction of the field of view of the user based on the monitored movement.

22. The method of claim 13, wherein the sensor is configured to monitor a movement of a muscle in an eye of the user and the processor is configured to determine the direction of the field of view of the user based on the monitored movement.

23. The method of claim 13, further comprising:
generating, by the processor, a virtual reality environment;
transmitting, by the processor, data that includes the virtual reality environment and a plurality of content to the display device; and
displaying, by the display device, the plurality of content, the plurality of content including a plurality of virtual objects.

24. The method of claim 13, further comprising determining, by the processor, a characteristic of the haptic track based at least in part on a virtual distance between the user and the first content or the second content.

* * * * *